US011708170B2

(12) United States Patent
Antraygue

(10) Patent No.: US 11,708,170 B2
(45) Date of Patent: Jul. 25, 2023

(54) THRUST CONTROL ASSEMBLY

(71) Applicant: Ratier-Figeac SAS, Figeac (FR)

(72) Inventor: Cédric Antraygue, Figeac (FR)

(73) Assignee: RATIER-FIGEAC SAS, Figeac (FR)

(*) Notice: Subject to any disclaimer, the term of this patent is extended or adjusted under 35 U.S.C. 154(b) by 445 days.

(21) Appl. No.: 16/679,904

(22) Filed: Nov. 11, 2019

(65) Prior Publication Data

US 2020/0148379 A1 May 14, 2020

(30) Foreign Application Priority Data

Nov. 12, 2018 (EP) .................................... 18306480

(51) Int. Cl.
*B64D 31/06* (2006.01)
*B64D 31/04* (2006.01)

(52) U.S. Cl.
CPC ............ *B64D 31/06* (2013.01); *B64D 31/04* (2013.01)

(58) Field of Classification Search
CPC ........ B64D 31/06; B64D 31/04; G05G 5/005; G05G 5/02; G05D 1/0055
See application file for complete search history.

(56) References Cited

U.S. PATENT DOCUMENTS

| | | | | |
|---|---|---|---|---|
| 4,040,581 A * | 8/1977 | Schlanert | ................ | B64C 13/30 244/233 |
| 4,567,786 A * | 2/1986 | Sakurai | .................. | B64D 31/04 244/220 |
| 5,264,768 A * | 11/1993 | Gregory | ............... | G05B 19/409 318/632 |
| 5,347,204 A * | 9/1994 | Gregory | ............... | B64C 13/042 318/632 |
| 5,412,299 A * | 5/1995 | Gregory | ............... | G05D 1/0061 318/568.17 |
| 5,473,235 A * | 12/1995 | Lance | ................. | B64C 13/0421 318/632 |
| 5,778,659 A * | 7/1998 | Duesler | ..................... | F02K 1/09 244/110 B |
| 5,984,241 A | 11/1999 | Sparks | | |
| 6,311,928 B1 | 11/2001 | Presz, Jr. | | |
| 7,370,468 B2 | 5/2008 | Colotte | | |
| 8,050,780 B2 * | 11/2011 | Tessier | ................ | B64C 13/0421 318/568.17 |
| 8,548,714 B2 * | 10/2013 | Andrieu | ................... | G05G 5/03 244/234 |
| 8,659,403 B2 | 2/2014 | Frayman | | |
| 8,892,295 B2 | 11/2014 | Zaccaria | | |

(Continued)

FOREIGN PATENT DOCUMENTS

WO 8401446 A1 4/1984

OTHER PUBLICATIONS

Extended European Search Report for International Application No. 18306480.7 dated Apr. 25, 2019, 10 pages.

*Primary Examiner* — Christopher D Hutchens
(74) *Attorney, Agent, or Firm* — Cantor Colburn LLP

(57) ABSTRACT

A thrust control assembly includes a balk application arrangement which provides, in response to a received balk command to prohibit command of thrust in a balk direction, a balk force on a rotatable thrust lever acting to oppose an attempt by the pilot to move the lever in a direction so as to command or increase thrust in the balk direction. The balk application arrangement controls an auto-throttle actuator to provide the balk force on the thrust lever.

19 Claims, 12 Drawing Sheets

(56) References Cited

U.S. PATENT DOCUMENTS

| | | | |
|---|---|---|---|
| 10,054,079 B2* | 8/2018 | Kopecek | F02K 1/766 |
| 10,343,786 B2* | 7/2019 | Nestico | F02K 3/06 |
| 2003/0094539 A1* | 5/2003 | Schaeffer | B64C 29/0033 |
| | | | 244/17.13 |
| 2004/0010354 A1* | 1/2004 | Nicholas | B64C 13/503 |
| | | | 701/4 |
| 2005/0080495 A1* | 4/2005 | Tessier | B64C 13/503 |
| | | | 700/63 |
| 2007/0285037 A1* | 12/2007 | Potter | H02P 3/26 |
| | | | 318/377 |
| 2010/0042267 A1* | 2/2010 | Goodman | F02K 1/76 |
| | | | 701/3 |
| 2012/0153085 A1* | 6/2012 | Good | B64C 9/24 |
| | | | 244/99.2 |
| 2012/0205494 A1* | 8/2012 | Taylor | B64C 13/10 |
| | | | 244/223 |
| 2013/0133465 A1* | 5/2013 | Kreitmair-Steck | B64C 13/345 |
| | | | 74/504 |
| 2014/0190304 A1 | 7/2014 | Elabellaoui et al. | |
| 2015/0006057 A1* | 1/2015 | Domingo | F01D 21/02 |
| | | | 701/99 |
| 2015/0090810 A1 | 4/2015 | Lallement | |
| 2015/0198930 A1* | 7/2015 | Antraygue | B64D 31/06 |
| | | | 318/635 |
| 2016/0207633 A1* | 7/2016 | McWaters | B64D 27/10 |
| 2016/0304190 A1* | 10/2016 | Groh | B64C 13/505 |
| 2017/0297732 A1* | 10/2017 | Waltner | B64C 27/04 |
| 2018/0134404 A1 | 5/2018 | Granier et al. | |
| 2020/0002018 A1* | 1/2020 | Alaimo, Jr. | B64D 31/14 |

* cited by examiner

THRUST CONTROL ASSEMBLY

FOREIGN PRIORITY

This application claims priority to European Patent Application No. 18306480.7 filed Nov. 12, 2018, the entire contents of which is incorporated herein by reference.

FIELD

The present disclosure relates to a thrust control assembly for an aircraft, a system for an aircraft including such an assembly, and methods of operating such an assembly or system.

BACKGROUND

The jet engines of an aircraft may be operated in forward or reverse thrust mode. Thrust reversal may be used to help slow the aircraft down immediately after landing. While the aircraft's brakes alone would typically be capable of bringing the aircraft to a halt within the available distance, it is often desirable to use reverse thrust to assist the aircraft brakes. This may help to reduce wear of the brakes and may enable the aircraft to be brought to a halt within a shorter distance, reducing the landing distance required. Reverse thrust may also be used to stop the aircraft in other situations, such as following an aborted take-off.

In order to implement a reverse thrust mode of the engine, a thrust reverser system may be activated. A thrust reverser system may include one or more movable thrust reverser components which, in order to implement reverse thrust mode, are movable to a position in which the thrust reverser components divert the thrust of the engine in a forward direction (relative to the aircraft) so as to create reverse thrust on the aircraft. For example, in an engine having core and bypass flow paths, the or each thrust component may divert air from a bypass flow path of the engine to provide the reverse thrust. The or each thrust reverser component is movable between a stowed, inactive position and a deployed, activated position for activating reverse thrust mode. The thrust reverser component(s) may be thrust reverser doors (often referred to as "blocker doors"). For example, the doors may be pivotable between stowed and deployed positions. The thrust reverser system may include other components, which may also be movable between stowed and deployed positions for implementing reverse thrust mode. For example, a part of the engine cowl may be opened to allow air redirected by the thrust reverse components to escape from the engine in the forward direction. The engine cowl may comprise one or more slidable panels, for this purpose. Redirected air may be caused to pass through cascades before passing through the opening.

It is of critical importance that the thrust reverser components are fully returned to the stowed, inactive position, before forward thrust mode can be initiated. Otherwise, a command from the pilot to implement forward thrust mode after implementation of reverse thrust mode, for example when taxiing after landing, could result in the inadvertent application of reverse thrust. Conversely, it is critical that the thrust reverser components are fully in the deployed, active position, before reverse thrust mode is initiated. Otherwise, a command from a pilot to implement reverse thrust mode might cause forward thrust to be inadvertently applied when braking of the aircraft is required. Ensuring that the thrust reverser components are in the appropriate position before initiating forward or reverse thrust mode is also important to avoid damage to the thrust reverser components.

There are other situations in which initiation of forward or reverse thrust mode may be inappropriate. For example, where the speed of the aircraft is too high during landing, it may be inappropriate to apply reverse thrust. For example, this might be the case in arrangements where there are multiple engines on each side of an aircraft, and reverse thrust is to be applied to only one of the engines on a side of the aircraft i.e. differential reverse thrust, so as to provide steering of the aircraft on the runway. Similarly, when manually controlling thrust during flight i.e. in the air, initiation of reverse thrust would be inappropriate.

One technique which has been proposed to prevent the pilot from moving the thrust lever of an aircraft to implement forward or reverse thrust until this is appropriate based on the position of the thrust reverser components is described in U.S. Pat. No. 5,984,241 (MPC Products Corporation). In the arrangements described in U.S. Pat. No. 5,984,241, a mechanical lock arrangement including first and second locks is used to prevent movement of the thrust lever in first and second directions as appropriate to prevent initiation of reverse or forward thrust modes until the thrust reverser components are in an appropriate position. The condition of the lock is controlled by the state of a solenoid, which, in turn, is dependent upon the position of the thrust reverser components. The reliance upon solenoids in such arrangements has some drawbacks. For example, solenoids are relatively heavy, and may be unreliable and expensive to provide.

The present disclosure is directed to providing an improved thrust control assembly for an aircraft, systems comprising such an assembly, and method of operating such assemblies and systems.

SUMMARY

In accordance with a first aspect the present disclosure provides a thrust control assembly for an aircraft that includes a movable thrust lever which may be used by a pilot to control the thrust of an engine of the aircraft when implementing at least one of forward and reverse thrust modes of the aircraft. The thrust control lever is coupled to a hub at least in the at least one of forward and reverse thrust modes of the aircraft such that movement of the lever causes movement of the hub, and, conversely, movement of the hub may cause movement of the lever. The position of the hub controls an amount of thrust of the engine when operating in the at least one of forward or reverse thrust modes. The assembly also includes an auto-throttle actuator arranged to automatically move the hub for controlling the position of the hub to thereby control a forward thrust amount of the aircraft when the aircraft is operating in forward thrust mode in flight and an auto-throttle mode is enabled and a balk application arrangement to provide, in response to a balk command received by the balk application arrangement to prohibit command of thrust in a balk direction corresponding to a or the given thrust direction which the thrust lever is operable to control, a balk force on the thrust lever acting to oppose an attempt by the pilot to move the lever in a direction so as to command or increase thrust in the balk direction. The balk application arrangement is arranged to control the auto-throttle actuator to provide the balk force on the thrust lever.

The technology described herein extends to a method of using the thrust control assembly in accordance with any of the embodiments described herein to provide a balk force on the movable thrust lever. As used herein, the balk force is a force acting to oppose an (or any) attempt by the pilot to move the lever in a direction so as to command or increase thrust in a balk direction (where the balk direction corresponds to a or the given thrust direction which the thrust lever is operable to control). A or the given thrust direction that the thrust lever is operable to control corresponds the (thrust) direction of a or the given thrust mode that the thrust lever is operable to control. Thus, references to a or the given thrust direction that the thrust lever is operable to control may be replaced by a reference to the direction of a or the given thrust mode that the thrust lever is operable to control. A thrust mode direction may be forward or reverse. Thrust is applied in a forward direction when implementing forward thrust mode and in a reverse direction when implementing reverse thrust mode. Thus, the balk application arrangement prohibits command of thrust in a balk direction corresponding to the direction of a or the given thrust mode i.e. forward or reverse thrust mode that the lever is operable to control. The method comprises the balk application arrangement receiving a balk command to prohibit command of thrust in a balk direction corresponding to a or the given thrust direction which the thrust lever is operable to control, and controlling the auto-throttle actuator to provide the balk force on the thrust lever.

In accordance with a further aspect there is provided a method of providing a balk force on a thrust lever of a thrust control assembly for an aircraft, the method inlcudes providing a thrust control assembly that includes a movable thrust lever which may be used by a pilot to control the thrust of an engine of the aircraft when implementing at least one of forward and reverse thrust modes of the aircraft. The thrust control lever is coupled to a hub at least in the at least one of forward and reverse thrust modes of the aircraft such that movement of the lever causes movement of the hub, and, conversely, movement of the hub may cause movement of the lever, wherein the position of the hub controls an amount of thrust of the engine when operating in the at least one of forward or reverse thrust modes. The assembly also includes an auto-throttle actuator arranged to automatically move the hub for controlling the position of the hub to thereby control a forward thrust amount of the aircraft when the aircraft is operating in forward thrust mode in flight and an auto-throttle mode is enabled and a balk application arrangement to provide, in response to a balk command received by the balk application arrangement to prohibit command of thrust in a balk direction corresponding to a or the given thrust direction which the thrust lever is operable to control, a balk force on the thrust lever acting to oppose an attempt by the pilot to move the lever in a direction so as to command or increase thrust in the balk direction. The balk application arrangement is arranged to control the auto-throttle actuator to provide the balk force on the thrust lever. The method further includes: the balk application arrangement receiving a balk command to prohibit command of thrust in a balk direction corresponding to a or the given thrust direction which the thrust lever is operable to control; and controlling the auto-throttle actuator to provide the balk force on the thrust lever.

The present disclosure in this further aspect may include any of the features described in relation to the other aspects, to the extent they are not mutually exclusive, and vice versa. Thus, the assembly or system as later defined may comprise means for implementing any of the method steps described, or the method may comprise performing any of the steps the system or assembly is described as performing.

In accordance with the disclosure in any of its aspects, the thrust lever is movable e.g. rotatable within a range of motion of the lever for controlling (an amount of) the thrust of the engine in the at least one of forward and reverse thrust modes. The movable thrust lever may be movable e.g. rotatable between an idle position and a position corresponding to maximum thrust in relation to the or each one of the forward and reverse thrust modes of the aircraft that it is operable to control. The thrust lever is movable e.g. rotatable in opposite directions within a range of motion of the lever in respect of the or each one of the forward and reverse thrust modes in order to increase or decrease the thrust amount in the respective thrust mode. Movement of the rotatable thrust lever within the range of motion of the thrust lever in respect of the or each thrust direction causes movement of the hub e.g. rotation of the hub about a pivot point within a range of motion of the hub. The direction and amount of movement e.g. rotation of the hub is dependent upon the direction and amount of movement e.g. rotation of the thrust lever for controlling the amount of thrust in the or a thrust direction. Conversely the direction and amount of movement e.g. rotation of the thrust lever is dependent upon the direction and amount of movement e.g. rotation of the hub when coupled thereto in the at least one of the forward and reverse thrust modes.

The position e.g. rotational position of the hub determines the amount of thrust in the or each one of the forward and reverse thrust modes. The position e.g. rotational position of the hub is associated with a thrust amount e.g. a thrust setting of the engine in the or each one of the forward and reverse thrust modes. Thus, the thrust amount may be controlled by the thrust lever acting on the hub, or by directly moving e.g. rotating the hub in an auto-throttle mode. The movement e.g. rotation of the hub will then cause movement e.g. rotation of the thrust lever so that the position of the thrust lever reflects the amount of thrust applied.

It is envisaged that the position of the hub may directly or indirectly determine i.e. control the amount of thrust in a given direction. This applies whether the hub is moved by the lever i.e. to provide a manual thrust setting, or whether the hub is used to move the lever to indicate a thrust amount set by automatic movement of the hub. For example, the amount of thrust may be set based upon a detected position of one or more position sensors associated with the hub. In other embodiments, it is envisaged that hub might indirectly determine i.e. control the amount of thrust e.g. where the hub is arranged to move with another component e.g. another hub, with the amount of thrust being set based upon a detected position of one or more position sensors associated with the other component e.g. hub.

The thrust lever may be rotatable or translatable to control the thrust of the engine when implementing the at least one of forward and reverse thrust modes. Similarly, the hub may be rotatable or translatable to control the thrust amount in the at least one of forward and reverse thrust mode. Thus, while embodiments herein are described in relation to the case in which the movement of a lever and hub is rotational movement, the movement may alternatively be translational movement. The thrust lever and hub may then both be rotatable or both translatable. In embodiments the thrust lever is a rotatable thrust lever, and is coupled to the hub in the at least one of forward and reverse thrust modes of the aircraft such that rotation of the lever causes rotation of the hub i.e. about a pivot point, and, conversely, rotation of the hub about the pivot point may cause rotation of the lever, wherein the rotational position of the hub about the pivot point controls the amount of thrust of the engine when operating in the at least one of forward and reverse thrust modes. The auto-throttle actuator is then arranged to automatically rotate the hub about the pivot point for controlling the rotational position of the hub. Where the hub and/or lever are translatable, the translation may be a linear movement.

In some embodiments the thrust control assembly comprises a single movable e.g. rotatable thrust lever which is operable to control the thrust (amount) of the engine when operating in both forward or reverse thrust modes, wherein the thrust lever is moveable within a first range of motion for controlling a forward thrust amount of the engine and within a second range of motion for controlling a reverse thrust amount of the engine. In embodiments using a single thrust lever, the thrust control lever is coupled to the hub in both forward and reverse thrust modes of the aircraft such that movement e.g. rotation of the lever causes movement of the hub e.g. rotation of the hub about the pivot point. Movement of the thrust lever within the first range of motion for controlling a forward thrust amount of the engine will result in movement of the hub within a first range of motion of the hub, and movement of the thrust lever within the second range of motion for controlling a reverse thrust amount of the engine will result in movement of the hub within a second range of motion of the hub. Conversely, movement of the hub within the first range of motion of the hub will result in movement of the thrust lever within a first range of motion of the lever (for controlling a forward thrust amount of the engine), and movement of the hub within a second range of motion of the hub will result in movement of the thrust lever within a second range of motion of the lever (for controlling a reverse thrust amount of the engine).

The thrust lever may be arranged to move e.g. rotate with the hub. The first and second range of motion of the thrust lever may then correspond to the first and second ranges of motion of the hub respectively. The first and second ranges of motion of the levers and/or hub may be non-overlapping ranges. The first and second ranges of motion of the lever may be defined on either side of an idle position of the lever. Each range of motion may be defined between an idle position of the lever and a maximum thrust position of the lever for the thrust direction concerned. The direction and amount of rotation of the hub is dependent upon the direction and amount of rotation of the thrust lever, and may correspond thereto. The first range of motion may be larger than the second range of motion of the lever or hub. In these embodiments, a single hub may be provided, which controls both forward and reverse thrust.

Where the thrust lever is a single rotatable thrust lever which may be used by a pilot to control the thrust of an engine of the aircraft when implementing forward and reverse thrust modes of the aircraft, the thrust control lever is coupled to the hub in the forward and reverse thrust modes of the aircraft such that movement e.g. rotation of the lever causes movement of the hub e.g. rotation of the hub about a pivot point, and, conversely, movement of the hub e.g. rotation of the hub about the pivot point may cause movement e.g. rotation of the lever, wherein the position of the hub e.g. rotational position of the hub about the pivot point controls the amount of thrust of the engine when operating in the forward and reverse thrust modes, and the balk application arrangement is arranged to provide, in response to a balk command received by the balk application arrangement to prohibit command of thrust in a balk direction corresponding to either one or both of the forward and reverse thrust directions, a balk force on the movable e.g. rotatable thrust lever acting to oppose an attempt by the pilot to move the lever in a direction so as to command or increase thrust in the or each balk direction.

Such arrangements using a single thrust lever may be referred to as a "pull through" configuration. Any suitable arrangement may be used to prevent inadvertent application of reverse thrust. In general, the pilot is required to positively select reverse thrust by activation of a reverse thrust enabling mechanism. A reverse thrust enabling mechanism may be provided which must be manipulated by the pilot to enable the thrust lever to be moved into (and optionally within) the reverse thrust range. For example, a reverse thrust trigger lever may be provided. It will be appreciated that a pull through type lever arrangement may be implemented using a rotatable lever, associated with a rotatable hub, or using a translatable lever, which may be associated with a translatable hub.

In other embodiments the movable e.g. rotatable thrust lever is one of a pair of movable e.g. rotatable thrust levers which may be used by a pilot to control the thrust of an engine of the aircraft in forward and reverse thrust modes of the aircraft, wherein the pair of movable e.g. rotatable thrust levers includes a forward thrust lever which is operable to control a thrust amount of the engine when operating in forward thrust mode, and a reverse thrust lever which is operable to control a thrust amount of the engine when operating in a reverse thrust mode. In embodiments, both thrust levers are rotatable thrust levers.

Where the movable e.g. rotatable thrust lever is one of a pair of thrust levers for controlling forward and reverse thrust of the engine respectively, the movable e.g. rotatable thrust lever may then be the thrust lever for controlling a thrust amount of the engine when operating in one of the forward and reverse thrust modes of the aircraft. In embodiments using forward and reverse thrust levers, the thrust lever in respect of a given thrust direction i.e. forward or reverse is coupled to the hub at least in the corresponding one of the forward and reverse thrust modes such that movement e.g. rotation of the lever causes movement of the hub e.g. rotation of the hub about the pivot point, and movement of the hub e.g. rotation of the hub about the pivot point may cause movement e.g. rotation of the lever.

In one example, the forward lever is coupled to a forward hub, and the reverse lever is coupled to a reverse hub. The hubs are interlocked with one another during forward thrust mode, such that the forward lever is coupled to both the forward and reverse hubs. Thus, in forward thrust mode, movement of the forward thrust lever results in movement of both the forward and reverse hubs together, and movement of the reverse hub will cause movement of the forward hub and the forward lever. During reverse thrust mode, the reverse hub is coupled to the reverse thrust lever, but the forward thrust lever is decoupled from the reverse hub (with the interlock being released). In reverse thrust mode, movement of the reverse hub will cause movement of the reverse thrust lever and vice versa. Thus, the forward and reverse thrust levers are each coupled to the reverse hub during forward thrust mode, and the reverse thrust lever (e.g. and not the forward thrust lever) is coupled to the reverse hub during reverse thrust mode. In such arrangements, the auto-throttle may be arranged to drive the reverse hub, and control of thrust in auto-throttle mode may be based upon the position of the reverse hub, since the reverse hub is arranged to move with the forward thrust lever during forward thrust mode. The technology described herein may be implemented by causing the auto-throttle actuator to act on the reverse hub to provide a balk force on the applicable thrust lever for providing a balk force in the required direction or directions since the reverse hub is coupled to the forward and reverse thrust levers respectively in forward and reverse thrust modes. Thus, in embodiments using a pair of thrust levers, the hub referred to herein may be a reverse hub.

In embodiments in which the thrust lever is one of a pair of thrust levers, the thrust lever may be rotatable within a respective range of motion of the lever for controlling the thrust of the engine when implementing the given thrust direction. The ranges of motion (for controlling thrust) for the forward and reverse thrust levers may differ. The rotation of a thrust lever in respect of a given thrust direction may cause movement e.g. rotation of the hub in a range of motion of the hub, which may correspond to the range of motion of the thrust lever. It is envisaged that the ranges of motion of the hub associated with movement e.g. rotation of the forward and reverse thrust levers may or may not overlap.

The movable e.g. rotatable thrust lever described herein to which a balk force is applied may be either one of the pair of thrust levers i.e. the forward or reverse thrust lever, in embodiments having a pair of thrust levers, unless the context demands otherwise. The present disclosure extends to thrust control assemblies including such a pair of levers. A balk force may be applied to both the forward and reverse thrust levers as required as each is coupled to the hub at least when implementing the given thrust direction associated with the lever.

Where the movable e.g. rotatable thrust lever is one of a reverse and forward thrust lever of a pair of thrust levers of the thrust control assembly, the thrust control lever is coupled to the hub at least in the one of the forward and reverse thrust modes of the aircraft which the thrust lever is operable to control, such that rotation of the lever causes movement of the hub e.g. rotation of the hub about a pivot point, and, conversely, movement of the hub e.g. rotation of the hub about the pivot point may cause movement e.g. rotation of the lever, wherein the position of the hub e.g. rotational position of the hub about the pivot point controls the amount of thrust of the engine when operating in the one of forward or reverse thrust mode, and the balk application arrangement is arranged to provide, in response to a balk command received by the balk application arrangement to prohibit command of thrust in a balk direction corresponding to the given thrust direction which the thrust lever is operable to control, the balk force on the movable e.g. rotatable thrust lever acting to oppose an attempt by the pilot to move the lever in a direction so as to command or increase thrust in the balk direction.

The thrust control assembly may comprise a movable e.g. rotatable thrust lever which may be used by a pilot to control the thrust of an engine of the aircraft when implementing the other one of the forward and reverse thrust modes of the aircraft, wherein the thrust control lever is coupled to the hub at least in the other one of forward and reverse thrust modes of the aircraft such that movement e.g. rotation of the lever causes movement of the hub e.g. rotation of the hub about the pivot point, and, conversely, movement of the hub e.g. rotation of the hub about the pivot point may cause movement e.g. rotation of the lever, wherein the position e.g. rotational position of the hub about the pivot point controls the amount of thrust of the engine when operating in the other one of forward or reverse thrust mode, and the balk application arrangement is arranged to provide, in response to a balk command received by the balk application arrangement to prohibit command of thrust in a balk direction corresponding to the given thrust direction which the thrust lever is operable to control, a balk force on the movable e.g. rotatable thrust lever acting to oppose an attempt by the pilot to move the lever in a direction so as to command or increase thrust in the balk direction, wherein the balk application arrangement is arranged to control the auto-throttle actuator to provide the balk force on the thrust lever.

As mentioned above, the hub may be a reverse hub in arrangements having forward and reverse hubs. The auto-throttle actuator may interact with the reverse hub for providing a balk force in respect of either of the thrust levers.

In embodiments, the forward thrust lever is moveable e.g. rotatable within a range of motion of the forward thrust lever for controlling a forward thrust amount of the engine and the reverse thrust lever is movable e.g. rotatable within a range of motion of the reverse thrust lever for controlling a reverse thrust amount of the engine. Movement of each lever in its respective range of motion may be between an idle position of the lever and a maximum thrust position of the lever (i.e. maximum thrust in the thrust direction concerned). Movement of the forward thrust lever within the range of motion of the forward thrust lever for controlling a forward thrust amount of the engine will result in movement of the hub within a first range of motion of the hub, and movement of the reverse thrust lever within the range of motion of the reverse thrust lever for controlling a reverse thrust amount of the engine will result in movement of the hub within a second range of motion of the hub. The first and second ranges of motion of the hub may overlap. For example, this may be possible where there is some other input to the aircraft control system to specify which direction of thrust is being controlled e.g. a signal indicative of the thrust mode i.e. reverse or forward thrust mode of the engine. For example, a switch may be provided to discriminate between movement e.g. rotation of the hub in relation to the forward or reverse thrust mode. However, in embodiments, the first and second ranges of motion of the hub do not overlap. Thus, the thrust applied to the engine, and the direction of the thrust, may be determined from the position e.g. angular position of the hub alone, as with embodiments using a single thrust lever. A forward thrust lever may be arranged to move e.g. rotate with the hub as in embodiments using a single thrust lever described above.

In embodiments having forward and reverse thrust levers, the reverse thrust lever may be mounted onto the forward thrust lever. Such configurations may be referred to as a "piggy back" configuration. The reverse thrust lever may be rotatable relative to the forward thrust lever for controlling reverse thrust. As with the alternative configurations using a single thrust lever described above, features may be provided to prevent inadvertent application of reverse or forward thrust. For example, one or more features may be provided to prevent simultaneous rotation of both of the forward and reverse thrust levers. One lever may only be moved if the other is in a locked position. Alternatively or additionally the pilot may be required to position the forward thrust lever in a given position e.g. rotational position e.g. corresponding to an idle position before the reverse thrust lever may be moved out of a stowed position. The pilot may be unable to move the forward thrust lever unless the reverse thrust lever is in a stowed position relative to the forward thrust lever. The use of an interlock between forward and reverse hubs may provide a further way of preventing inappropriate command of forward or reverse thrust e.g. an (or any) attempt to command both directions of thrust simultaneously.

It will be appreciated in embodiments having one or more rotatable thrust lever, the or each rotatable thrust lever is rotatable about a respective pivot point. The pivot point may, e.g. in arrangements using a single thrust lever, or in the case of a forward thrust lever of a pair of thrust levers, correspond to a pivot point about which the hub rotates. In embodiments using reverse and forward thrust levers, the reverse thrust lever may rotate about a pivot point that is different to a pivot point of the hub e.g. a pivot point defined where the reverse thrust lever is joined to the forward thrust lever. The reverse thrust lever may be connected by a linkage to the hub.

As used herein, in rotational embodiments, the position of a lever or hub refers to a rotational or angular position of lever or hub, and references to the movement of the lever or hub should be understood to refer to the rotation of the lever or hub unless the context demands otherwise. In other embodiments, the position of the lever or hub refers to a translational position of the lever or hub.

In any of the embodiments of the present disclosure, a position of the hub controls the amount of thrust of the engine when operating in the at least one of the forward or reverse thrust mode controlled by the thrust lever. In embodiments, the hub is movable e.g. rotatable within a respective range of motion defined on at least one, and optionally both sides (e.g. clockwise and anticlockwise for rotational movement) of a position corresponding to an idle position of the hub for controlling thrust in one, and optionally both of forward and reverse directions. The or each range of motion is defined between the idle position and a position corresponding to maximum thrust. For ease of reference, movement e.g. rotation of the hub from the idle position in a direction for increasing forward thrust may be considered to be within a range of positive positions e.g. angular or translational positions of the hub, while movement e.g. rotation of the hub from the idle position in a direction for increasing reverse thrust may be considered to be within a range of negative positions e.g. angular or translational positions of the hub. The thrust amount may be set by reference to a sensed position of the hub.

The thrust control assembly includes an auto-throttle actuator arranged to automatically drive i.e. move e.g. translate or rotate the hub about a pivot point for controlling the position e.g. rotational position of the hub to control a forward thrust amount of the aircraft when the aircraft is operating in forward thrust mode in flight and an auto-throttle mode is enabled. It will be appreciated that movement of the hub e.g. rotation of the hub about a pivot point will result in rotation of the thrust lever for controlling the forward thrust of the engine. This may provide feedback to the pilot as to operation of the auto-throttle. The auto-throttle actuator is arranged to rotate the hub about the pivot point in response to a control signal received from an auto-throttle controller.

The auto-throttle actuator forms part of an auto-throttle control system of the aircraft. The auto-throttle actuator comprises a motor which is arranged to drive the hub i.e. cause movement e.g. rotation of the hub. The motor may be arranged to drive i.e. move e.g. rotate the hub via an intermediate arrangement. The intermediate arrangement used will depend upon the type of motion of the hub involved e.g. rotatable or translational, and may involve cooperating gears. For example, a pinion and rotating sector gear may be used for rotational arrangements, or a pinion and rack gear for translational arrangements. When the aircraft is operating in forward thrust mode in flight and an auto-throttle mode is enabled, a torque of the motor is controlled by an auto-throttle controller to result in movement of the hub to control the amount of thrust of the engine for providing a desired flight characteristic e.g. speed of flight. This may be achieved using current control circuitry, for example based on feedback indicative of a determined speed of movement e.g. angular speed of the hub. The speed of the hub may be correlated to e.g. correspond to a speed of movement of the (forward) thrust lever. The speed of movement of the hub may be determined using a sensed position of a rotor of the motor of the auto-throttle actuator. The position of the rotor may be correlated to a position of the hub and hence may be used in determining the hub speed. The thrust control assembly comprises an arrangement to enable the pilot to switch off and/or temporarily disable the auto-throttle control system when desired.

The balk application arrangement is arranged to provide, in response to a balk command received by the balk application arrangement to prohibit command of thrust in a balk direction corresponding to a or the given thrust direction which the thrust lever is operable to control, a balk force on the movable e.g. rotatable thrust lever acting to oppose an (or any) attempt by the pilot to move the lever in a direction so as to command or increase thrust in the balk direction. The balk force biases the lever in a direction (of movement e.g. rotation) away from the direction (of movement e.g. rotation) corresponding to increased thrust in the balk direction. The balk force is provided on the thrust lever over a range of positions of the thrust lever in a range of motion of the thrust lever for controlling thrust in the balk direction.

The balk application arrangement is arranged to control the auto-throttle actuator to provide the balk force on the thrust lever. The balk application arrangement may comprise circuitry for controlling the auto-throttle actuator in this manner. The balk application arrangement may be implemented, for example, by (circuitry of) a control system of the throttle control assembly, e.g. an electronics control unit (ECU) thereof, such as an auto-throttle control system e.g. ECU. Thus, in embodiments the balk application arrangement is provided by a subsystem of a control system of the thrust control assembly. For example, the balk application arrangement may be provided by an electronics control unit (ECU) of the throttle control assembly, such as an auto-throttle control system e.g. ECU.

The balk force (e.g. the magnitude and, where applicable, direction thereof) applied to the thrust lever may be controlled through control of the magnitude (and, where applicable, direction) of torque provided by a motor of the auto-throttle actuator used to move the hub. In embodiments, the auto-throttle actuator comprises a motor arranged to drive i.e. cause movement e.g. rotation of the hub, and the balk application arrangement is arranged to control a torque of a motor of the actuator to provide the balk force on the thrust lever.

Control of the torque of the motor to provide the balk force may be achieved using current control circuitry. The balk application arrangement may be arranged to control (e.g. comprise circuitry for controlling) the current supplied to the motor of the auto-throttle actuator for providing the balk force. This may be achieved using the existing current control circuitry of the auto-throttle actuator, but with the current being controlled to try to achieve a target force on the thrust lever. It will be appreciated that in controlling the current supplied to the motor (e.g. magnitude and, where applicable, direction of current), the torque provided by the motor may be controlled. The current supplied to the motor may be correlated to balk force using a torque constant of the motor.

The motor of the auto-throttle actuator may be arranged to drive i.e. cause movement e.g. rotation of the hub via an intermediate arrangement. The intermediate arrangement may comprise cooperating gears. For example, in rotational arrangements, the intermediate arrangement may comprise a pinion which is rotated by the motor, and cooperates with a gear e.g. sector gear associated with the hub to cause rotation of the hub. In translational arrangements, the pinion may cooperate with a gear, such as a rack gear associated with the hub to cause translational movement of the hub.

The balk force is provided on the thrust lever over a range of positions of the thrust lever in a range of motion of the thrust lever for controlling thrust in the balk direction. Thus, the balk application arrangement may be arranged to provide the balk force when the thrust lever is in a position within such a range of positions. The balk application arrangement may be arranged to control the auto-throttle actuator to provide, and optionally control, the balk force on the thrust lever based on a determined position of the lever The determined position of the thrust lever may be based on a sensed position of the thrust lever, or may be based on any data which may be used to determine a position of the thrust lever. It will be appreciated that the position of the lever may be correlated to a position of the hub and vice versa. Thus, the determined position of the lever may be based at least in part on a determined position of the hub. In embodiments, the determined position of the thrust lever is based at least in part on a sensed position i.e. rotational position of a rotor of the motor of the auto-throttle actuator. The position of the rotor may be sensed by a set of one or more position sensors associated with the rotor. Thus the thrust control assembly may comprise a set of one or more position sensors for sensing the position e.g. angular/rotational position of the rotor. In embodiments the determined position of the thrust lever is based on a sensed position of the rotor of the motor and a sensed position of the thrust lever. The thrust control assembly may comprise a set of one or more position sensors for sensing the position e.g. rotational position of the thrust lever. In embodiments, the determined position of the thrust lever may be provided as input to current control circuitry of the balk application arrangement for controlling a current supplied to a motor of the auto-throttle actuator. The determined position of the thrust lever may be provided as a feedback signal to the current control circuitry.

In embodiments the balk application arrangement is arranged to control the auto-throttle actuator to provide (e.g. control) the balk force based on a balk feel characteristic profile. This may be achieved using the determined position of the lever. The balk feel characteristic profile may be a profile indicative of a dependence of force to be applied to the thrust lever upon position e.g. rotational position of the thrust lever. The balk application arrangement may be arranged to use the balk feel characteristic profile to determine a force to be applied to the thrust lever for a given position e.g. rotational position of the thrust lever. The balk feel characteristic profile may be a stored profile that the balk application arrangement is arranged to access. The profile may be stored by the balk application arrangement or elsewhere provided that it is accessible thereto. The profile may be stored in an ECU of the thrust control assembly e.g. an auto-throttle ECU.

In embodiments the balk feel characteristic profile may be a profile indicative that a constant opposing force (i.e. balk force) is to be applied to the thrust lever over a given range of movement of the thrust lever in the direction so as to command or increase thrust in the balk direction. Alternatively, the profile may be a profile indicative that an increasing opposing force is to be applied to the thrust lever over a given range of movement of the thrust lever in the direction so as to command or increase thrust in the balk direction.

The range of movement of the thrust lever over which the opposing force (balk force) is applied may be a continuous range of movement. The given range of movement of the thrust lever over which the balk force is applied may correspond to an entire range of motion of the thrust lever for controlling thrust in the balk direction e.g. the entire range of motion of the thrust lever for controlling forward or reverse thrust, or a sub range thereof. The given range of movement may extend to the limit of the range of motion of the thrust lever associated with maximum thrust in the balk direction i.e. maximum forward or reverse thrust. This may be the upper limit of the range of motion. The given range of movement may start from a predetermined position of the thrust lever, which may be an idle position of the lever or a position e.g. rotational position in proximity thereto e.g. corresponding to or in proximity to a position at which thrust in the balk direction would be initiated. This may be the lower limit of the range of motion. In embodiments the balk force is not applied until the thrust lever is moved out of an idle position by a predetermined amount e.g. a rotation of the thrust lever through a few degrees, to provide some tolerance in the application of the balk force.

Where the opposing force (balk force) is an increasing opposing force, the force may be set to an initial balk force when the thrust lever is at a predetermined position e.g. rotational position e.g. when the lever is at the idle position or a position e.g. rotational position in proximity thereto, with the force increasing from the initial balk force with movement of the thrust lever in a direction so as to increase thrust in the balk direction. The balk force may increase smoothly from the initial force. The balk force may increase from the initial balk force throughout the remainder of the given range of movement of the thrust lever.

The magnitude of the balk force or forces may be selected as desired. The balk force, or, where applicable, the initial balk force, should be such as to at least provide sufficient opposition to movement of the thrust lever in the balk direction to deter the pilot from taking such action, and may be sufficient to prevent the pilot from being able to move the thrust lever in the balk direction. In embodiments, once the thrust lever is at a predetermined position corresponding to a position at which a balk force is to be applied, the balk force is applied substantially instantaneously with respect to position of the thrust lever. Thus, the balk feel characteristic profile may comprise a step to an initial level of balk force (from which the balk force may further increase, or may remain constant). The step may be a step from a zero balk force.

The balk feel characteristic profile may be free from maxima and/or minima.

It will be appreciated that the position of the hub may be correlated to a position of the thrust lever. Thus, the balk feel characteristic profile may be in respect of a position of the hub, which is accordingly indicative of the position of the thrust lever, or may be directly expressed in relation to the position of the thrust lever.

In embodiments the balk feel characteristic profile indicates the desired dependence of balk force upon position e.g. rotational position of the thrust lever as indicated by a position e.g. rotational position of the hub to which the lever is coupled when controlling thrust in the balk direction. In embodiments in which the hub is movable e.g. rotatable within a respective range of motion defined on both sides of a position corresponding to an idle position of the hub for controlling thrust in both of forward and reverse directions, the balk feel characteristic profile may indicate that the balk force to be applied in respect of the balk direction is zero for positions e.g. rotational/angular positions of the hub associated with the application of thrust in a direction opposite to the balk direction. In embodiments in which movement e.g. rotation of the hub from the idle position in a direction for increasing forward thrust may be considered to be within a range of positive position e.g. rotational/angular positions of the hub, and movement e.g. rotation of the hub from the idle position in a direction for increasing reverse thrust may be considered to be within a range of negative positions e.g. rotational/angular positions of the hub, the balk force applied in respect of the balk direction is applied in respect of at least some of a range of one of positive or negative positions e.g. angular/rotational positions of the hub, and may be zero for the other one of negative or positive positions e.g. rotational/angular positions of the hub. Of course, as described below, where a balk force is to be applied in the other one of forward and reverse directions (whether separately or simultaneously), a balk force may be specified in respect of the opposite balk direction in the other one of the positive and negative position e.g. angular/rotational position range.

The balk force may be applied (when the lever is in an applicable position) e.g. for a duration until the balk command is removed.

In embodiments, once the balk command is removed, the balk application arrangement may be arranged to gradually reduce the balk force (in the balk direction) on the thrust lever (to zero). In other words, the balk force is not removed instantaneously, but is allowed to reduce over a period of time. Removal of the balk command may be indicated in any suitable manner, e.g. may involve the sending of a signal to remove the balk command, or the cessation of a balk command signal etc. The balk application arrangement may comprise a smooth transition filter for causing the balk force to be reduced in this manner. In embodiments the balk application arrangement comprises a smooth transition arrangement for causing a gradual reduction in balk force upon removal of the balk command. The smooth transition arrangement may comprise a smooth transition filter. In embodiments, the smooth transition filter is initialised with the current balk force. This may be performed continually. Upon removal of the balk command, the balk arrangement may be arranged to provide a balk force on the thrust lever corresponding to the output of the filter.

The smooth transition filter may be a first order filter, or may be a higher order filter. In embodiments the filter is a first order filter having a cut-off frequency within the range of from 0.25 Hz to 2 Hz. However, this order of filter and frequency range is merely exemplary.

The balk command may be received by the balk application arrangement from a control system of the aircraft e.g. from a balk command generating subsystem thereof. The control system may be arranged to generate a balk command for prohibiting the application of thrust in a balk direction when it is determined that application of thrust in the balk direction would be inappropriate. This may be for any one of a number of reasons. In embodiments the control system is arranged to generate the balk command based on a position of blocker doors of a thrust reverser system of the aircraft. In embodiments the control system is arranged to generate a forward balk command for prohibiting command of forward thrust when it is determined that the blocker doors are not in a fully stowed, inactive position, and/or to generate a reverse balk command for prohibiting command of reverse thrust when it is determined that the blocker doors are not in a fully deployed, active position. Alternatively or additionally, the control system may be arranged to generate a reverse balk command when the speed of the aircraft exceeds a predetermined limit when on the ground, or when the aircraft is in flight in a manual thrust control mode i.e. with the auto-throttle inactive.

The present disclosure extends to a system for an aircraft comprising the thrust control assembly of any of the embodiments described herein, and a control system, wherein the control system is arranged to generate a balk command for prohibiting the application of thrust in a balk direction when it is determined that application of thrust in the balk direction would be inappropriate. This may be in any of the situations described above. In embodiments the system further comprises a thrust reverser system comprising blocker doors for use in diverting thrust to implement a reverse thrust system of the aircraft in use, and the control system is arranged to generate the balk command based on a position of the blocker doors. In embodiments the control system generates a forward balk command for prohibiting command of forward thrust when it is determined that the blocker doors are not in a fully stowed, inactive position, and/or generates a reverse balk command for prohibiting command of reverse thrust when it is determined that the blocker doors are not in a fully deployed, active position. While the use of the technology in the context of operation of a thrust reverser system is described herein, it is appreciated it may alternatively or additionally be applied to any situation where the command of thrust in a particular direction or directions would be inappropriate e.g. potentially dangerous or might risk damaging the aircraft.

The disclosure in this further aspect may include any or all of the features described in relation to the other aspects to the extent they are not mutually exclusive.

A balk command as used herein is a command to prohibit the command (e.g. initiation or increase) of thrust in a particular direction (the "balk direction"). A balk command may be a forward balk command or a reverse balk command i.e. for prohibiting application of thrust in the forward or reverse directions respectively. It is envisaged that forward and reverse balk commands may be independently provided, separately or simultaneously i.e. such that they are in effect separately or simultaneously in time.

Where a balk command is provided in respect of both directions, a balk force may be applied to the same thrust lever in respect of the other balk direction where a single thrust lever is used to command both forward and reverse thrust, or to the other one of the forward and reverse thrust levers of the assembly, where separate forward and reverse thrust levers are provided. Balk forces in respect of opposite directions may be provided over ranges of motion associated with respective forward and reverse thrust levers, or with respect to first and second ranges of motion associated with a single thrust lever i.e. in respect of forward and reverse thrust. The balk force in a particular direction will be provided when the position of the (applicable) thrust lever is in an applicable range of motion. While the balk commands may be simultaneously in effect, the pilot will only feel the balk force in a given direction when moving the (applicable) thrust lever to a position to attempt to command or increase thrust in the prohibited direction. Thus, the balk forces in the opposite directions will not be felt simultaneously. Regardless of whether a single or pair of thrust levers are used, balk forces in respect of opposite directions may be applied in respect of ranges of motion of the hub on either side of an idle position e.g. in respect of positive and negative positions e.g. rotational positions of the hub defined relative to the idle position. Balk feel characteristic profiles may indicate the balk force to be applied in respect of different balk directions as positive and negative respectively.

Thus, the balk application arrangement may be arranged to provide, in response to a balk command received by the balk application arrangement to prohibit command of thrust in a balk direction corresponding to a or the given thrust direction which the thrust lever is operable to control, a balk force on the thrust lever acting to oppose an attempt by the pilot to move the lever in a direction so as to command or increase thrust in the balk direction, and in response to a balk command received by the balk application arrangement to prohibit command of thrust in an opposite balk direction corresponding to a or the given thrust direction which the or a thrust lever is operable to control, a balk force on the or a thrust lever acting to oppose an attempt by the pilot to move the lever in a direction so as to command or increase thrust in the opposite balk direction.

Where the assembly comprises a thrust lever which may be used by a pilot to control the thrust of an engine of the aircraft when implementing both forward and reverse thrust modes of the aircraft, the balk application arrangement may be arranged to provide, in response to a balk command received by the balk application arrangement to prohibit command of thrust in a balk direction corresponding to one of the forward and reverse thrust directions, a balk force on the thrust lever acting to oppose an attempt by the pilot to move the lever in a direction so as to command or increase thrust in a direction corresponding to the forward or reverse thrust direction. The balk application arrangement may be arranged, in response to a balk command received by the balk application arrangement to prohibit command of thrust in a balk direction corresponding to the other one of the forward and reverse thrust directions, to provide a balk force on the thrust lever acting to oppose an attempt by the pilot to move the lever in a direction so as to command or increase thrust in the balk direction corresponding to the other one of the forward and reverse directions. This may be carried out separately or simultaneously to the providing of the balk force in the one of the forward and reverse directions. By "simultaneously" it is meant that the balk forces may be in effect simultaneously, such that if the thrust lever (or applicable thrust lever) is moved to a position so as to command or increase thrust in either direction, the balk force will be felt. References to a balk force being provided separately in another direction refer to the balk force being in effect only in respect of one direction at a time, such that if the thrust lever (or applicable thrust lever) is moved to attempt to command or increase thrust in the (other) direction, no balk force is felt.

Where the assembly comprises forward and reverse thrust levers, the balk application arrangement may be arranged to provide, in response to a balk command received by the balk application arrangement to prohibit command of thrust in a balk direction corresponding to the forward thrust direction, a balk force on the forward thrust lever acting to oppose an attempt by the pilot to move the lever in a direction so as to command or increase thrust in the forward balk direction. The balk application arrangement may (e.g. separately or simultaneously) be arranged to provide, in response to a balk command received by the balk application arrangement to prohibit command of thrust in a balk direction corresponding to the reverse thrust direction, a balk force on the forward thrust lever acting to oppose an attempt by the pilot to move the lever in a direction so as to command or increase thrust in the reverse balk direction. The applicable balk force will be provided when the or a lever is in a range of positions over which the balk force is to be applied e.g. corresponding to a range of motion for commanding or increasing thrust in the balk direction.

Balk commands in different directions, whether implemented at the same or different times, may be implemented in the manner described in relation to any of the embodiments described above e.g. using a balk feel characteristic profile etc.

A balk command may be indicated in any suitable manner e.g. by a balk command signal. The balk command signal may trigger application of the balk force. The balk command signal may be provided over the duration that the balk command is in force, or a further signal may be provided to indicate when the balk command is to be removed, or any suitable arrangement may be used to indicate when the balk command is applicable.

In accordance with any of the aspects of the technology described, the balk application arrangement is operable to provide a balk force when the aircraft is not in an auto-throttle control mode. For example, this may be when the aircraft is on the ground i.e. when the aircraft is not in a flight mode, or, in certain circumstances, in flight i.e. when the auto-throttle control mode is inactive, when a reverse balk might be commanded.

The use of the auto-throttle actuator to implement balk commands as described herein enables solenoid balks which have been used to provide a balk to be omitted. In embodiments the thrust control assembly is free from solenoids.

The balk application arrangement herein may comprise a balk application circuit or circuitry. Any reference to circuitry herein may be replaced by a reference to one or more circuits.

The term "ECU" used herein refers to an electronics control unit if not explicitly stated.

Any thrust lever is movable in both directions to decrease and increase thrust within a range of motion associated with a given thrust direction.

References to "an attempt" by a pilot to move a lever in a direction so as to command or increase thrust in the balk direction may be understood to refer to "any such attempt". The disclosure extends to a system or assembly in accordance with any of the embodiments described installed in an aircraft.

It will be appreciated that, the technology in any of the aspects and embodiments described herein may include any of the features described in relation to any of the other aspects and embodiments described, to the extent they are not mutually exclusive.

DETAILED DESCRIPTION OF EMBODIMENTS

Figure 1A:
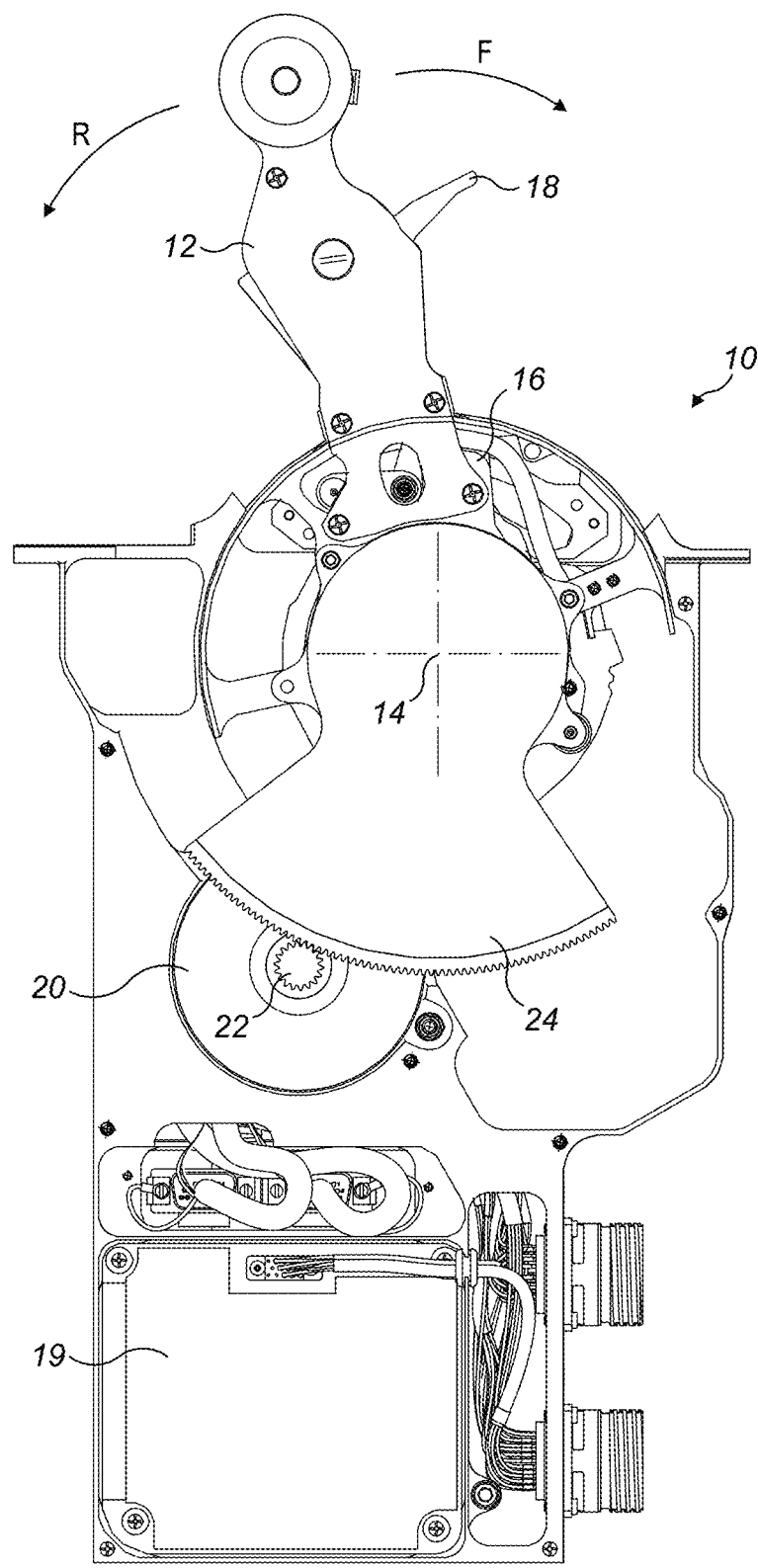
FIG. 1A illustrates schematically an embodiment of a thrust control assembly for an aircraft which may be used in implementing the techniques disclosed herein, with the thrust lever in an idle position.

Referring to FIG. 1A, a thrust control assembly 10 for an aircraft in accordance with a first embodiment to which the technology described herein may be applied will now be described. The thrust control assembly is for an aircraft having a thrust reverser system, and includes a thrust lever 12. The thrust control assembly is located in an aircraft flight deck, and is used by a pilot to control the amount of thrust of the aircraft engine, whether in forward or reverse thrust mode.

In the embodiment of FIG. 1A, the thrust lever 12 is rotatable with a hub 16 in either a clockwise or anticlockwise direction in a first range of motion about a pivot point 14 in order to increase or decrease engine thrust when operating in a forward thrust mode. The level of engine thrust is dependent upon the rotational position of the hub 16 about the pivot point 14. The way in which a thrust lever may be used to control the thrust level of an aircraft will not be described in detail. Reference is made, for example, to the aforementioned U.S. Pat. No. 5,984,241.

Figure 1B:
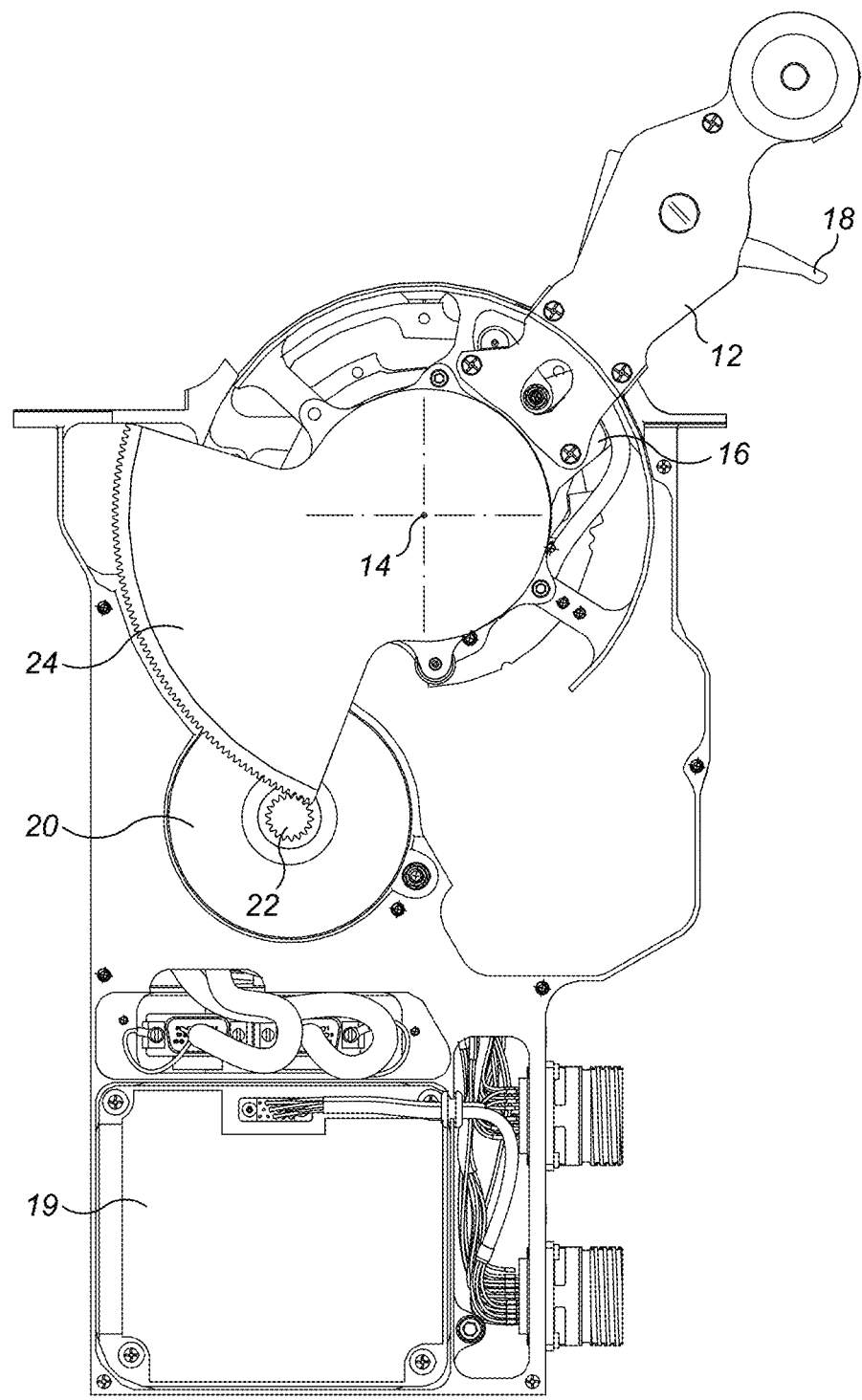
FIG. 1B illustrates the embodiment of FIG. 1A, but with the thrust control lever moved to a position of maximum forward thrust.

In the embodiment of FIG. 1A, the thrust lever is shown as being in the idle position. The thrust lever may be moved in the direction of arrow F to increase forward thrust. FIG. 1B illustrates the position of the thrust lever when in a maximum forward thrust position.

Figure 1C:
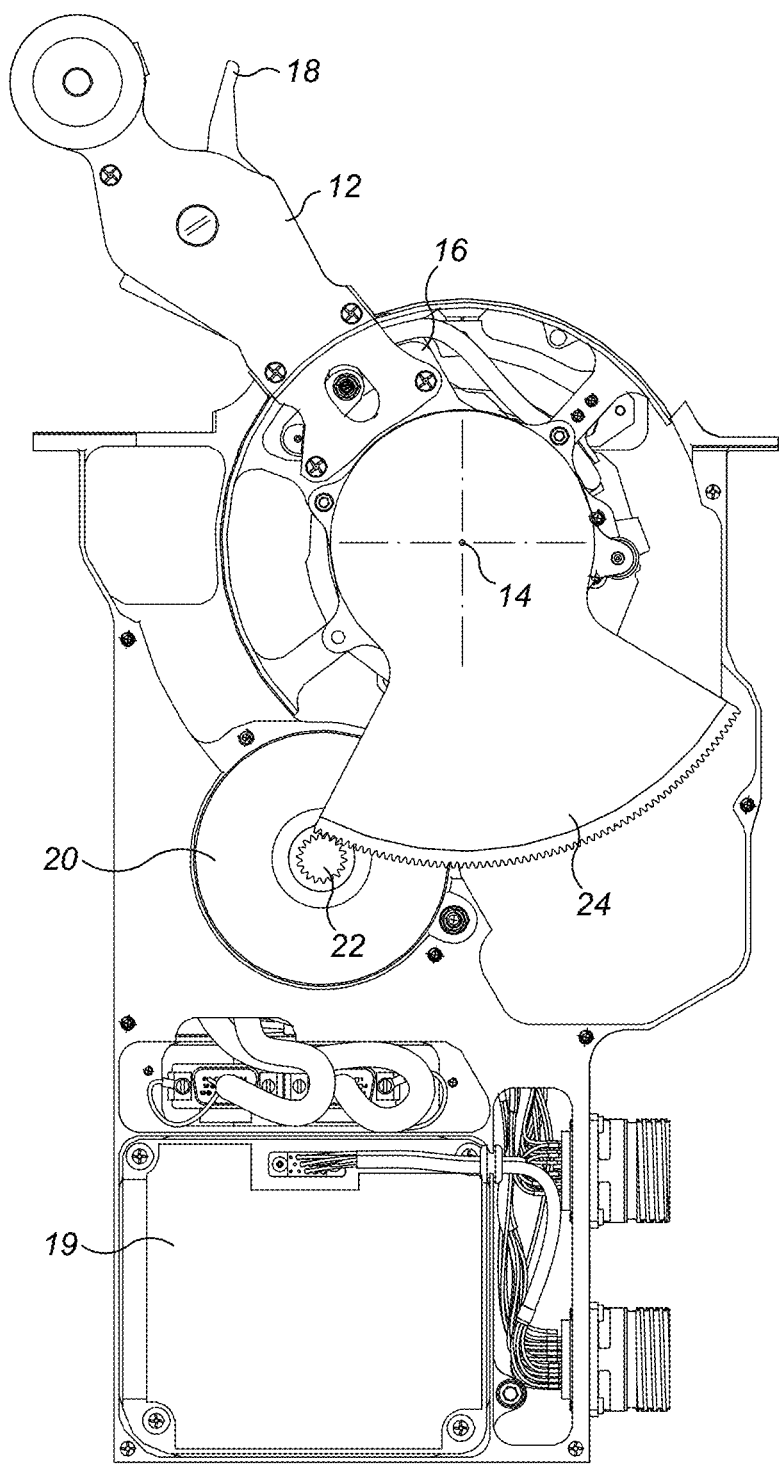
FIG. 1C illustrates the embodiment of FIG. 1A, but with the thrust control lever moved to a position of maximum reverse thrust.

The thrust lever 12 includes a reverse trigger lever 18 which may be operated by the pilot to enable the thrust lever 12 to be moved from the idle position show in FIG. 1A in the direction of arrow R into a range of motion associated with reverse thrust mode. Such arrangements using a reverse trigger lever for implementing reverse thrust are known as a "pull through configuration". FIG. 1C illustrates the position of the thrust lever 12 when the reverse trigger lever 18 has been operated to permit the thrust lever 12 to be moved to the position of maximum reverse thrust.

Rotation of the thrust lever 12 to control reverse or forward thrust as illustrated by reference to FIGS. 1A-C is associated with rotation of the hub 16, which rotates with the thrust lever 12. It will be seen that there is rotation of the hub 16 in a clockwise direction from the position shown in FIG. 1A as forward thrust is increased. Conversely, there is anti-clockwise rotation of the hub 16 about the pivot point 14 as reverse thrust is increased from the idle position shown in FIG. 1A to the position shown in FIG. 1C. The idle position of the hub may be taken as defining zero degrees of rotation, with rotation of the hub to provide forward thrust being considered to be in a positive direction, associated with a range of positive angles of rotation, and rotation to provide reverse thrust being in a negative direction, associated with a range of negative angles of rotation.

During manual operation, the position of the hub may be sensed and used to control thrust.

During flight, the engine may be driven in an auto-throttle mode, in which an auto-throttle control system controls the amount of thrust delivered in the forward thrust mode to try to achieve a desired flight characteristic e.g. speed of travel of the aircraft or power setting. An actuator 20 of the auto-throttle control system rotates the hub 16 about the pivot point 14 so as to control the amount of thrust delivered. Rotation of the hub results in rotation of the thrust lever 12 so as to provide feedback of the operation of the auto-throttle to the pilot. The thrust amount may be controlled based upon the sensed position of the hub. The operation of an auto-throttle control system will be described in more detail below by reference to FIG. 3.

Briefly, in auto-throttle mode, an auto-throttle electronics control unit (ECU) 19 provides a control signal to control the current supplied to a motor of the auto-throttle actuator 20. The current supplied to the motor will determine the torque developed by the motor. The torque provided by the motor will, via an appropriate intermediate arrangement, control the amount of rotation of the hub 16, and hence the thrust lever 12. For example, the actuator 20 may be used to drive a pinion 22, which may cooperate with a sector gear 24 associated with the hub 16 to cause rotation of the hub, and hence the thrust lever 12. Examples of auto-throttle arrangements are given in U.S. Pat. No. 5,984,241.

The assembly may be arranged to allow a pilot to enable or disable the auto-throttle feature as desired. Suitable arrangements are again exemplified in U.S. Pat. No. 5,984,241. For example, a button may be provided which must be depressed by the pilot when moving the thrust lever in order to temporarily disable the auto-throttle. A switch may be provided which may be used by the pilot to switch off the auto-throttle when it is desired for it to be deactivated for a longer period.

Figure 2A:
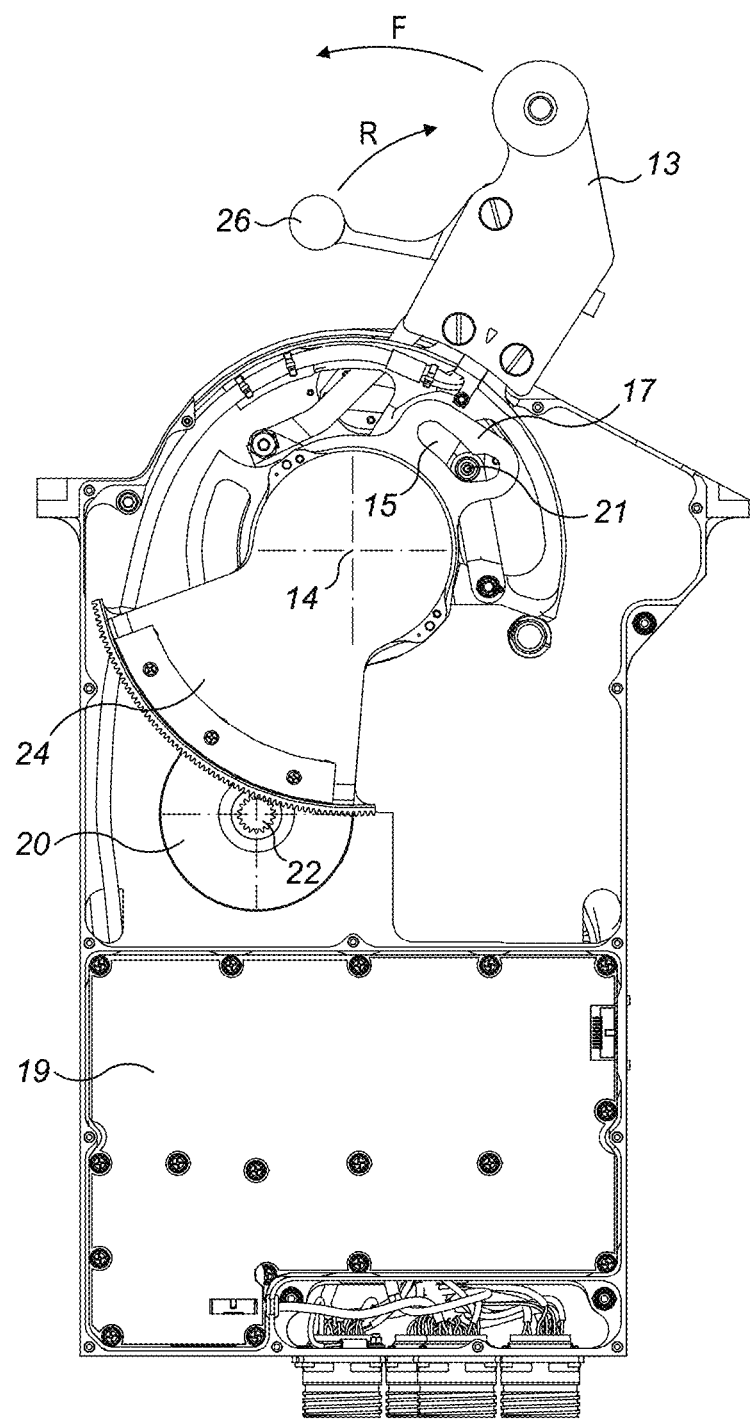
FIG. 2A illustrates schematically another embodiment of a thrust control assembly for an aircraft which may be used in implementing the techniques disclosed herein, showing the lever configuration for an idle position.
Figure 2B:
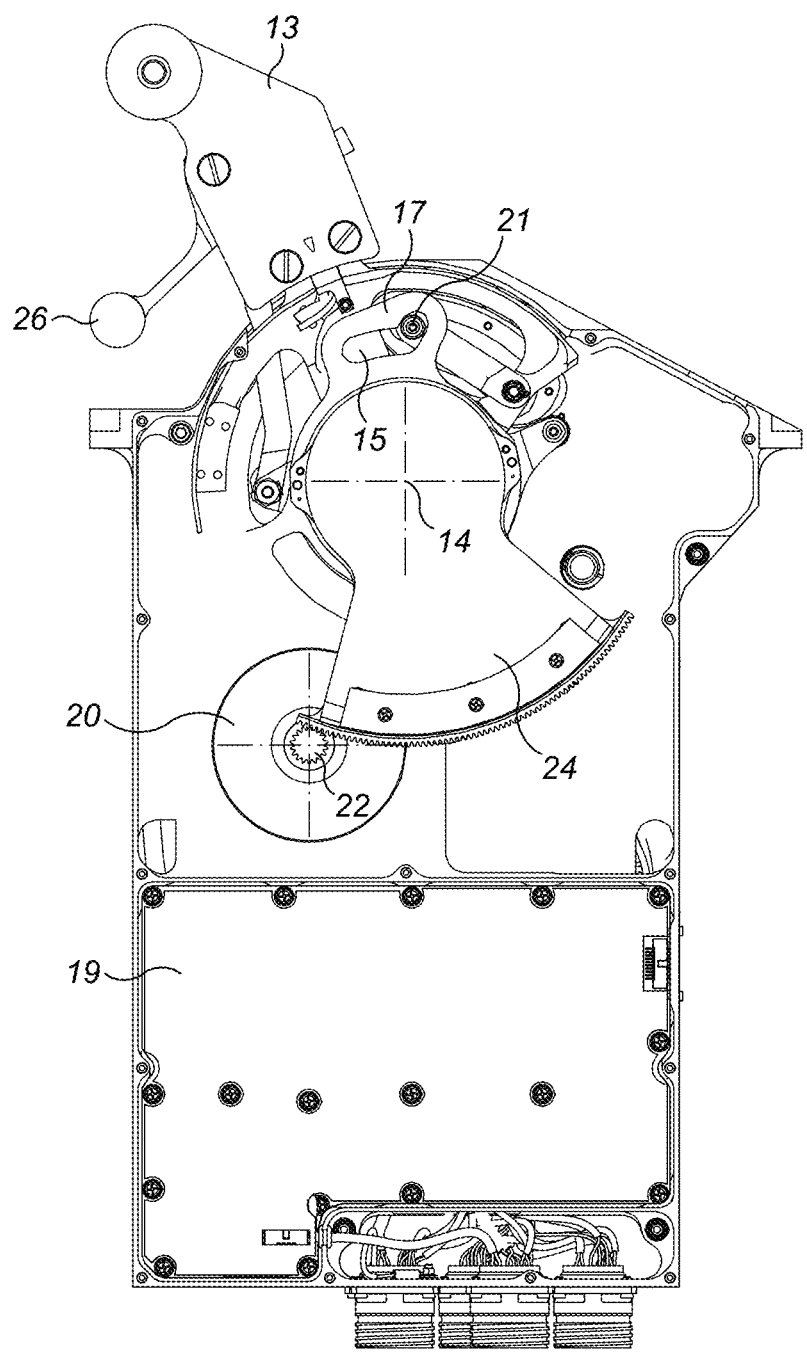
FIG. 2B illustrates the embodiment of FIG. 2A, but showing the lever configuration for maximum forward thrust.
Figure 2C:
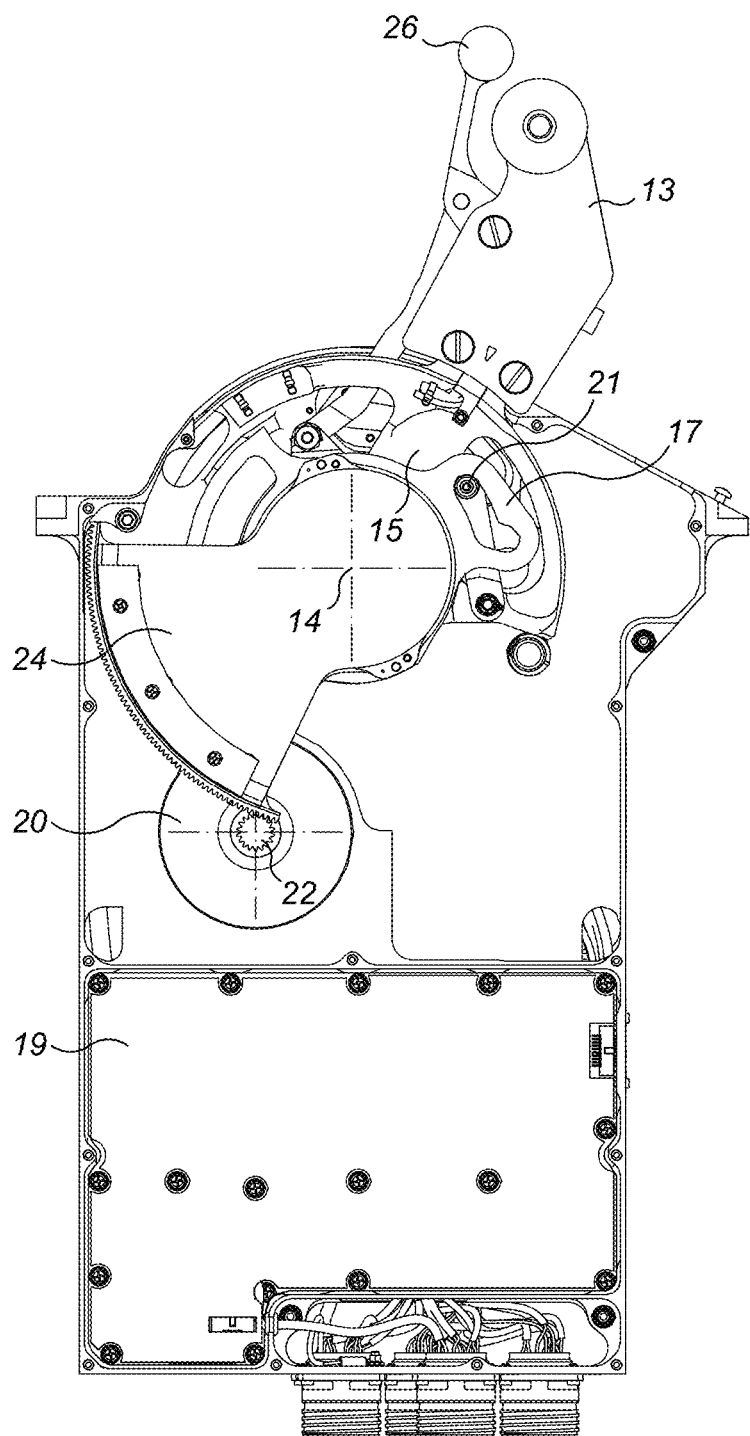
FIG. 2C illustrates the embodiment of FIG. 2C, showing the lever configuration for maximum reverse thrust.

It will be appreciated that the technology described herein is applicable to different configurations of thrust control assembly. FIGS. 1A-C illustrate one particular configuration of a thrust control assembly (in relation to the reverse thrust lever arrangement) to which the technology may be applied, known as a "pull through" configuration. Another configuration of thrust control assembly to which the technology is applicable is shown in FIGS. 2A-C. The arrangement of the thrust levers in this type of thrust control assembly is known as a "piggy back" configuration.

The embodiment of FIGS. 2A-C functions similarly to that of FIGS. 1A-C. Like components have been labelled with corresponding reference numerals. The main difference is in relation to the way in which reverse thrust may be commanded by a pilot. Rather than having a reverse trigger lever as in FIGS. 1A-C, in the embodiment of FIGS. 2A-C, the main thrust lever is used only to control forward thrust, i.e. providing a "forward thrust lever 13", and a reverse thrust lever 26 is mounted on the forward thrust lever 13. In order to control the level of reverse thrust applied when in a reverse thrust mode, the reverse thrust lever is rotated relative to the forward thrust lever 13 as indicated in the direction "R" while the forward thrust lever 13 remains in a fixed, idle position.

Rather than having a single hub as in the embodiments of FIGS. 1A-C, in the embodiments of FIGS. 2A-C, forward and reverse hubs 15 and 17 are provided. When operating in forward thrust mode, the forward and reverse hubs 15, 17 are interconnected with an interlock mechanism, such that rotation of the forward thrust lever 13 will result in rotation of the forward and reverse hubs 15,17 together. When operating in reverse thrust mode, rotation of the reverse thrust lever will result in rotation of the reverse hub 17 and not the forward hub 15.

The way in which the forward and reverse thrust levers may be rotated to control thrust, and the corresponding rotation of the hubs, is described in more detail by reference to FIGS. 2A-C.

FIG. 2A illustrates schematically the position of the forward thrust lever 13 and the reverse thrust lever 26 when the forward thrust lever is in the idle position. The forward thrust lever 13 may be moved in the direction of the arrow F to command and increase forward thrust to a maximum forward thrust position as shown in FIG. 2B. The reverse thrust lever 26 is locked in a fixed, undeployed position relative to the forward thrust lever 13 during forward thrust mode. In this mode, the forward and reverse hubs 15, 17 are locked together, such that the hubs rotate together with the forward thrust lever. In the embodiment illustrated, the interlocking is provided by a roller 21, which is at the blind end of a groove during application of forward thrust.

In order to activate reverse thrust mode, the forward thrust lever 13 is returned to the idle position shown in FIG. 2A, and the reverse thrust lever 26 is moved in the direction of the arrow R (shown in FIG. 2A) to increase reverse thrust to a maximum reverse thrust position as shown in FIG. 2C. Rotation of the reverse thrust lever 26 causes rotation of the reverse thrust hub 17. When the forward thrust lever 13 is in the idle position in reverse thrust mode, the reverse hub 17 may be moved independently of the forward hub 15. The interlock arrangement helps to prevent movement of the reverse thrust lever when in forward thrust mode and vice versa.

In these embodiments, the amount of thrust provided in either the forward or reverse thrust modes may be controlled by the position of the reverse hub 17, as rotation of this hub occurs in both the forward and reverse thrust modes. Thus, a thrust amount may be controlled based upon a rotational position of the reverse hub in both manual and auto-throttle modes. The rotational position of the hub may be sensed for use in controlling the thrust amount. The auto-throttle actuator is associated with the reverse hub 17, causing rotation of the reverse hub 17 to control the amount of forward thrust applied (since movement of the reverse hub 17 will correspond to movement of the forward hub 15 and forward thrust lever 13 in the forward thrust mode). Rotation of the reverse hub 17 caused by the auto-throttle actuator in the forward thrust mode will result in rotation of the forward thrust lever to provide feedback to the pilot.

It will be seen that there is rotation of the reverse hub 17 in an anti-clockwise direction from the position shown in FIG. 2A as forward thrust is increased. Conversely, there is clockwise rotation of the reverse hub 17 about the pivot point 14 as reverse thrust is increased from the idle position shown in FIG. 2A to the position shown in FIG. 2C. The idle position of the hub may be taken as defining zero degrees of rotation, with rotation of the hub to provide forward thrust being considered to be in a positive direction, associated with a positive angle of rotation, and rotation to provide reverse thrust being in a negative direction, associated with a negative angle of rotation. It will be appreciated that the convention is to define rotational positions of a hub within a range of motion associated with controlling forward thrust to be positive. Thus, although in the embodiments of FIGS. 1A-C and FIGS. 2A-C, the range of motion of the hub 15 (or, in the case of FIG. 2A-C, the reverse hub 17) associated with forward thrust is on the opposite side of the idle position considered to be taken as a zero degrees of rotation position, in both cases, the range of motion associated with forward thrust is taken to be positive. Of course, it is not necessary to define the positive and negative angles of rotation in accordance with this convention, and this system is merely used for ease of explanation herein.

The thrust control assemblies shown in FIGS. 1A-C and 2A-C are only exemplary. For example, rather than using a rotatable thrust lever or levers, one or more translatable thrust lever and hub may be used. The technology disclosed herein is equally applicable to such translational movement based embodiments. For example, in a pull-through arrangement similar to that of FIGS. 1A-C, rather than being rotatable, the thrust lever and hub may each be translatable to control the amount of thrust in the forward and reverse modes. Rather than using a pinion and rotating sector gear to transmit motion from the auto-throttle actuator to the hub/thrust lever, a sector gear and a translating rack gear attached to the thrust lever may then be used.

An exemplary embodiment of an auto-throttle control system will now be described by way of background. Such systems may be used in accordance with thrust control assembly embodiments of the type shown in FIGS. 1A-C or FIGS. 2A-C, or other assemblies utilising translational movement of a lever and hub.

Figure 3:
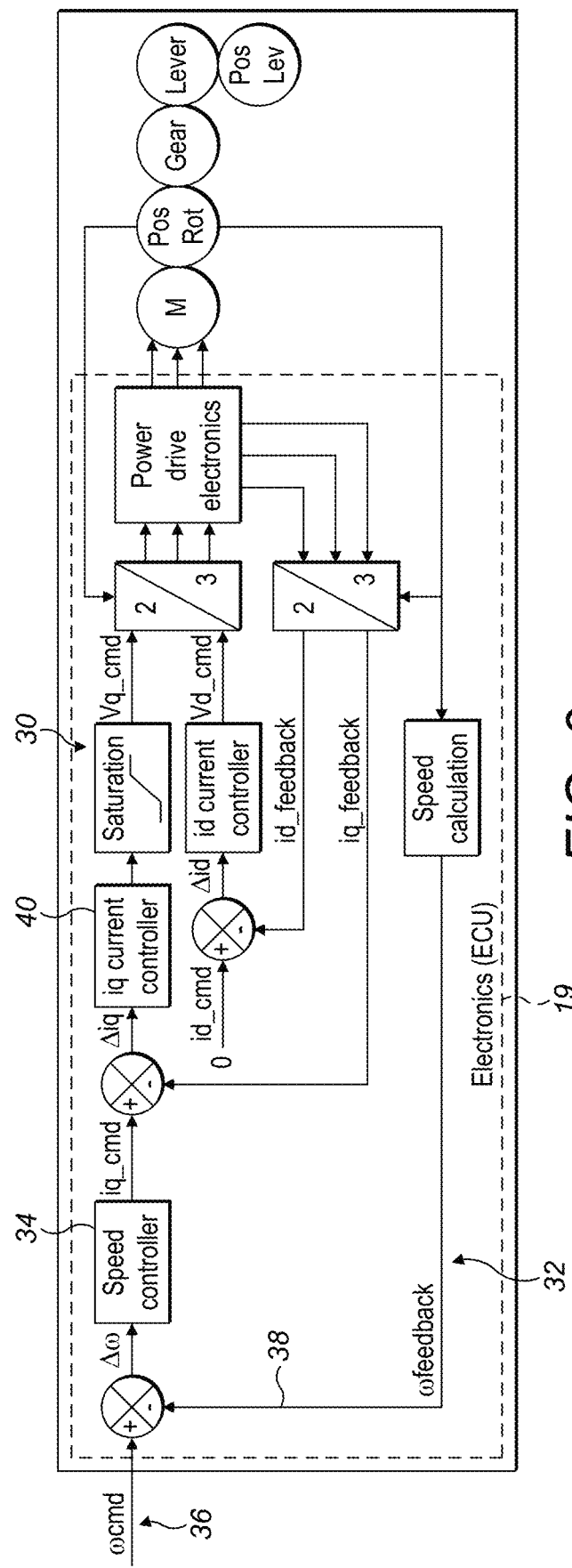
FIG. 3 illustrates an arrangement for implementing auto-throttle control of the thrust of an aircraft.

FIG. 3 illustrates the way in which digital speed control may be performed by the auto-throttle electronics control unit (ECU) 19 in order to implement auto-throttle functionality. This involves two feedback loops; a current control loop 30 inside a speed control loop 32. The following explanation will refer to the thrust control assembly of FIGS. 1A-C for ease of reference. The current control loop 30 controls the electromagnetic torque provided by the motor ("M") of the auto-throttle actuator 20. In turn, this will control the rotational position ("PosRot") of a rotor of the motor of the auto-throttle actuator, and hence the movement of the gear 24 ("Gear") which rotates the hub 16 about the pivot point 14 (and thus will control the rotational position ("PosLev") of the thrust lever 12). It will be appreciated that position sensors are provided for determining an angular position of the rotor of the motor (PosRot) and of the lever (PosLev).

The speed controller 34 receives a target angular speed 36 ωcmd of the hub16 from a control system of the aircraft. This commanded angular speed has been set to achieve a position of the thrust lever 12 to provide a thrust amount which will implement the desired flight characteristic. The speed of rotation of the hub will correlate to a speed of movement of the thrust lever. The speed controller 34 also receives, as input, a feedback signal 38 (ωfeedback) indicative of the current speed of rotation of the hub determined by performing a speed calculation based on a sensed angular position PosRot of the rotor. The speed controller uses a difference determined between the target and feedback angular speed signals (Δω) to set a target quadratic current (iq_cmd) to try to achieve the target angular speed of the rotor. The target direct current id_cmd is set to zero to ensure maximum torque for the motor. A saturation block is provided to limit the output of iq and hence limit the amount of torque provided by the system. The term "2/3" refers to a transformation matrix used to transform from two axes/phases to three axes/phases. This transformation is used, in the particular example illustrated, in providing vector control of the motor e.g. using a Field Oriented Control (FOC) method, which involves transforming AC variables of the motor, (which are three axes; a, b, c), into DC variables (2 axes; d,q) to facilitate control of the motor.

Control of the current to try to achieve the target quadratic current involves a current feedback loop 30 in which the iq current controller 40 controls the quadratic current based on a difference between the target quadratic current and a feedback signal indicative of the actual measured quadratic current (iq_feedback). A similar process is used to control the direct current based on a target direct current id_cmd and a feedback signal indicative of the measured direct current id_feedback. The details of the current feedback loop will not be described in further detail.

Operation in relation to the embodiment of FIGS. 2A-C would proceed in a similar manner, with the pinion 22 rotating the reverse hub 17 rather than the hub 16, to result in movement of the forward thrust lever 13. The speed of rotation of the reverse hub would be used in providing auto-throttle control in this case.

It is not always appropriate for reverse or forward thrust mode to be initiated. A number of controls may be provided to prevent command of reverse or forward thrust mode when this is not appropriate. The present disclosure is concerned with providing tactile feedback to the pilot to inhibit command of reverse or forward thrust mode when this is inappropriate, for example when the blocker doors of the thrust reverser system are not in an appropriate position. For example, when reverse thrust is to be initiated after forward thrust e.g. after landing in order to slow the aircraft, this should not be permitted until the blocker doors have reached the fully deployed, active position. Thus, movement of a thrust lever to initiate reverse thrust application should not be possible until the blocker doors have reached the fully deployed, active position. Such a movement may, in "pull through" type arrangements, be a movement of the thrust lever into a range of motion associated with reverse thrust e.g. from an idle position or a position associated with forward thrust. In "piggy back" type arrangements, such a movement may be any movement of the reverse thrust lever (e.g. from an idle position) with the forward thrust lever in a position to permit movement of the reverse thrust lever.

Conversely, where forward thrust is to be initiated following reverse thrust, e.g. when taxiing after landing, this should not be permitted until the blocker doors have reached the fully stowed, inactive position. Thus, movement of a thrust lever to initiate forward thrust application should not be possible until this is the case. Such a movement may, in "pull through" type arrangements, be a movement of the thrust lever into a range of motion associated with forward thrust e.g. from an idle position or a position associated with reverse thrust mode. In "piggy back" type arrangements, such a movement may be any movement of the forward thrust lever (e.g. from an idle position).

Another example of when command of reverse thrust mode may be inappropriate would be if the aircraft speed exceeded a predetermined threshold during landing. Furthermore, when the aircraft is in flight in a manual mode of operation, command of reverse thrust would be inappropriate.

When it is determined by a control system of the aircraft that it is necessary to inhibit movement of a thrust lever in a direction to command forward or reverse thrust, i.e. when it is deemed inappropriate for forward or reverse thrust to be applied, a forward or reverse balk command may be generated by the control system of the aircraft. Forward and reverse balk commands may be generated independently, at the same or different times. The forward or reverse balk command causes a force to be applied to the applicable thrust lever to oppose any attempt by the pilot to move the lever in a direction so as to command the prohibited forward or reverse thrust (i.e. when the thrust lever is moved to a position to try to command or increase the or a prohibited thrust direction). The opposing force is referred to as a balk force. As used herein, a forward balk command refers to a command to inhibit command of forward thrust, and a reverse balk command refers to a command to inhibit command of reverse thrust. In some situations, forward and reverse balk commands may be generated simultaneously. This is to try to ensure that the lever is maintained in an idle position. This may occur, for example, where the blocker doors are still in an intermediate position between a stowed, inactive and deployed, active position.

As shown, for example, in U.S. Pat. No. 5,984,241, thrust control assemblies have included solenoids to provide a force inhibiting movement of a thrust lever in the applicable direction in response to a balk command.

The present disclosure provides an improved thrust control assembly which, in embodiments at least, does not require the use of solenoids. The ability to remove solenoids from the thrust control assembly may provide a lighter and more reliable thrust control assembly. This is advantageous in the context of the thrust control assembly which is typically mounted in the cockpit of the aircraft. The resulting system may provide greater safety, as the problems of reliability associated with solenoids are avoided. For example, solenoids are often associated with problems such as jamming of the output shaft, or electrical failures. Removal of the solenoids may also reduce the power consumption of the thrust control assembly, and may provide a more cost effective arrangement.

The Applicant has realised that the auto-throttle actuator is only used during flight mode, i.e. in the air, when an auto-throttle mode is selected. However, during auto-throttle controlled flight mode the thrust reverser systems will not be operated. Thus, it has been recognised that when the auto-throttle is not being used to provide auto-throttle control of the aircraft e.g. when on the ground, or in flight but in a manual operation mode, the auto-throttle actuator may be used to provide a force inhibiting movement of the thrust lever in a given direction to provide forward or reverse thrust, for example, when the application of forward or reverse thrust would be inappropriate based upon the position of the blocker doors of the thrust reverser system, or for some other reason as discussed above. It has been found that the auto-throttle actuator may be used to generate a force comparable to that of the solenoids in arrangements of the type described in U.S. Pat. No. 5,984,241 to oppose movement of a thrust lever. However, it is not necessary that a force on a thrust lever of a magnitude that could not be overcome by a pilot need be provided, as the purpose of the balk force is to provide tactile feedback to the pilot that they are attempting to perform a prohibited operation. Typically additional controls would be provided to prevent initiation of a prohibited thrust mode.

Accordingly, it has been recognised that the current and speed control described by reference to FIG. 3 will only be performed in flight i.e. in the air, when an auto-throttle control mode is enabled. It has been recognised that when the aircraft is on the ground, or in the air with the auto-throttle control mode disabled, the current control loop may be used, rather than to implement a target speed of the motor to result in control of movement of the thrust lever to provide thrust for implementing a given flight characteristic, the current control loop may instead by used to control a force applied to the thrust lever to oppose movement of the thrust lever in a given direction so as to implement a balk command. A balk command as used herein refers to an instruction to inhibit command of thrust by the pilot in a given direction i.e. in the forward or reverse directions. Thus, in the embodiments of FIGS. 1A-C or 2A-C, a balk command may be implemented by causing the motor of the auto-throttle actuator to generate torque so as to rotate the pinion 22, and consequently, through interaction between the gear 24 and the pinion 22, rotate the hub 16 (or reverse hub 17) to result in a force being exerted on the applicable thrust lever in a direction to resist movement of the lever in the direction to command thrust in the direction prohibited by the balk command.

Figure 4:
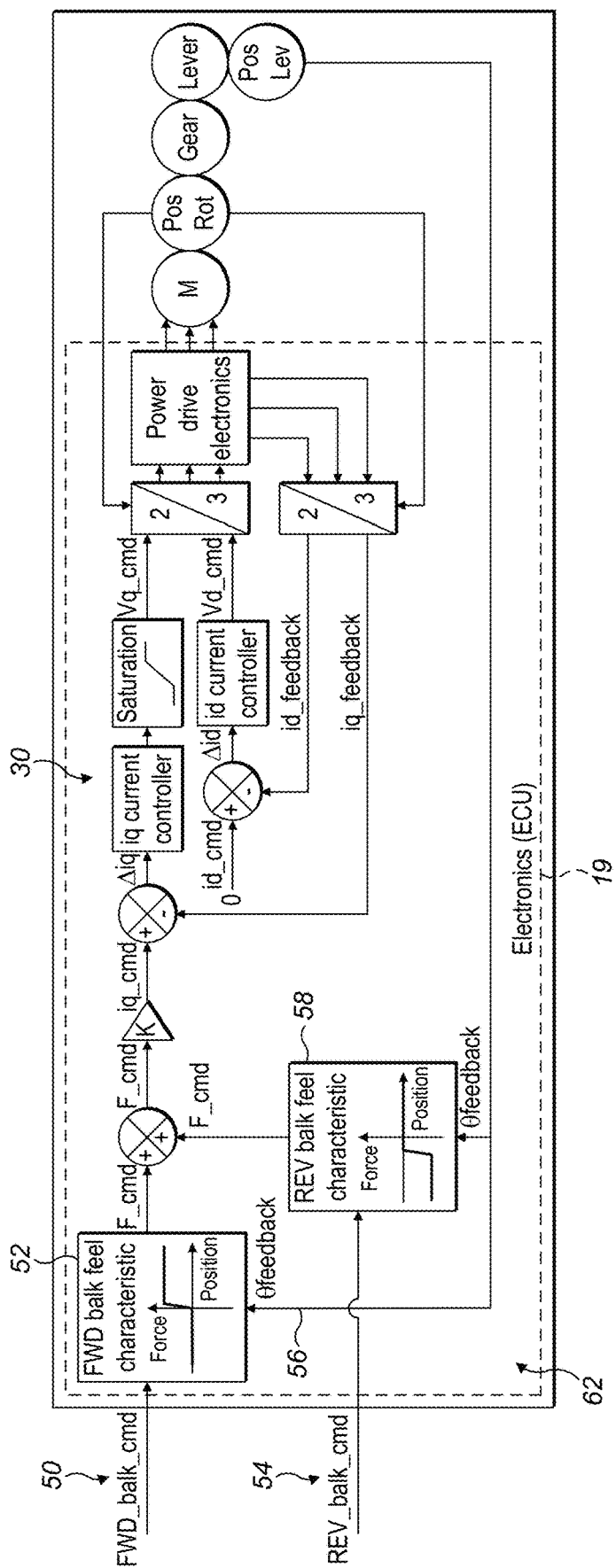
FIG. 4 illustrates an arrangement for implementing a balk command in accordance with an embodiment of the present disclosure.

FIG. 4 illustrates the way in which the current control loop of the arrangement shown in FIG. 3 may be used in this manner to provide a balk application arrangement. Rather than providing the current control loop inside a speed control loop, a force control loop 62 is now provided, with the current control loop 30 inside this loop. FIG. 4 illustrates the steps which may be taken by the balk application arrangement to implement either a forward or reverse balk command. Such commands may be provided at the same or different times as required. For ease of reference, the steps will be described by reference to the forward balk command, and by reference to a thrust control assembly of the type shown in FIGS. 1A-C.

A forward balk command 50 (FWD_balk_cmd) is received by the auto-throttle electronics control unit (ECU) 19 when it is determined to be inappropriate to command forward thrust e.g. until the thrust reverser blocker doors are in the stowed, inactive position. The forward balk command may be received from any control system of the aircraft. The ECU 19 stores a forward balk feel characteristic profile, indicative of a force-position profile describing the force to be applied to the thrust lever with respect to an angular position of the hub 16. The force is applied in a direction to oppose movement of the thrust lever 12 in the direction to command (or increase) forward thrust.

The ECU 19 determines a target force to be applied to the thrust lever 12 (F_cmd) for implementing the forward balk command using the forward balk feel characteristic profile 52 and a feedback signal 56 (Ofeedback) indicative of a sensed angular position of the thrust lever 12 (PosLev). The sensed position of the thrust lever enables the target force to be applied to the lever to be determined from the forward balk feel characteristic profile 52. The lever position sensor providing PosLev may be a dedicated sensor for the purposes of balk control, or an existing sensor used to provide thrust lever position data for use in thrust control in general. Thus, the position signal may be obtained from another aircraft system.

It will be appreciated that the position of the thrust lever may be correlated to a position of the hub 16. Thus, while the illustrated embodiment of FIG. 4 shows the feedback sensed angular position being that of the thrust lever, the position of the hub could alternatively or additionally be used. Furthermore, the position of the rotor of the motor of the auto-throttle actuator may be correlated to the position of the hub or thrust lever, and may alternatively or additionally be used in controlling application of the balk force.

In some advantageous embodiments, the target force is determined based on a determined angular position of the thrust lever which is based on both a sensed position of the thrust lever and a sensed position of the rotor of the motor i.e. PosLev and PosRot. Position sensors are typically provided to provide a feedback signal indicative of the position of the rotor of the motor of the auto-throttle actuator during auto-throttle mode for use in current control as described above. The position data may also be used in performing coordinate transformations, such as "Parke and Clarke" transformations, which may be used in FOC techniques involved in current control.

It has been recognised that it is advantageous to control the balk force based on a determined position of the thrust lever based on both a sensed position of the thrust lever i.e. PosLev and additionally a sensed position of the motor rotor i.e. PosRot. The sensed position of the rotor may provide a better resolution in terms of throttle lever position, as there is typically a reduction ratio between the lever and motor. As PosRot is measured using sensors within the motor there is no free play between the sensor and motor, avoiding e.g. non-linearities in the resulting force control, providing improved balk feel. By taking the sensed lever position additionally into account, the absolute position of the lever may be more accurately determined, as the motor rotor may rotate more than one revolution over the range of travel of the lever. However, it is envisaged that any signal indicative of the thrust lever position may be used, e.g. PosLev or PosRot alone.

The profile 52 might alternatively indicate the force to be applied with respect to position of the thrust lever. The target force (F_cmd) may be used to set a target quadratic current for implementing the target force using a torque constant of the motor.

In embodiments of the type shown in FIG. 2A-C, a given thrust lever would only be associated with one of positive or negative angular positions i.e. in respect of forward or reverse thrust.

If a reverse balk command 54 is also received, (REV_balk_cmd), a reverse balk feel characteristic profile 58 stored by the ECU, and the feedback signal 56 indicative of the sensed angular position of the thrust lever 12 (or a sensed angular position of the hub 16, or determined position of the lever based on sensed lever and motor rotor positions) is used in setting a target force to be applied to the thrust lever 12 (F_cmd) for implementing the reverse balk command. The target forces determined in respect of the forward and reverse balk commands are used to determine an overall target force F_cmd which is used to set the target quadratic current (iq_cmd) for the current control loop 30.

It will be appreciated that if only one of the forward or reverse balk commands are received, then the target force will be set based on the target force determined in respect of whichever balk command is present. The operation of the current loop is as described in the earlier embodiment of FIG. 3. In brief, quadratic and direct currents for the motor are determined based on a difference between the measured quadratic and direct currents, and the target quadratic and direct currents. The difference is in the manner in which the target current is set to implement a target force on the thrust lever, rather than a target angular speed of the hub as in the FIG. 3 embodiment.

The embodiment of FIG. 4 is equally applicable to a piggy-back type lever arrangement as shown in FIGS. 2A-C. In such embodiments, the auto-throttle actuator is arranged to drive the reverse hub 17. Thus, a balk force on the forward or reverse lever as appropriate, dependent upon the balk direction, may be obtained through control of the torque of the motor which drives the reverse hub, in the same manner as described in relation to the single hub and lever embodiment. When a reverse balk is to be applied, the reverse thrust lever is coupled to the reverse hub (the reverse balk being applied when the reverse thrust lever is in a position in a range associated with attempting command or initiate reverse thrust). When a forward balk is to be applied, the forward thrust lever is coupled to the reverse hub (the forward balk being applied when the forward thrust lever is in a position in a range associated with attempting command or initiate forward thrust). Thus, a balk force may, in either case, be applied to the applicable thrust lever through interaction between the auto-throttle actuator and the reverse hub, in the same manner described in relation to interaction between the hub 16 and the actuator in the single lever/hub embodiments.

The balk feel characteristic profiles will now be described in more detail with respect to FIGS. 5 and 6. The balk feel characteristic profile is a force against position profile. The balk feel characteristic profile may reproduce the feel of a stop. The position may be an angular position of the hub e.g. hub 16, which can be correlated to an angular position of the thrust lever e.g. lever 12 (for single hub and thrust lever arrangements as shown in FIGS. 1A-C), or of a reverse hub, which can be correlated to an angular position of the forward or reverse thrust lever as appropriate (for "piggy-back" type arrangements having forward and reverse thrust levers and hubs as shown in FIGS. 2A-C). It will be appreciated that in the embodiment of FIGS. 2A-C, the reverse hub has ranges of motion associated with forward and reverse thrust in the same manner as the hub 16 in the single hub embodiment of FIGS. 1A-C. The only difference is that the hub will cause movement of the reverse or forward thrust levers as appropriate depending upon the thrust mode selected.

The dependence of the force exerted on the or a thrust lever to oppose movement of the lever in a direction to command or increase the prohibited direction of thrust upon angular position of the hub, and hence thrust lever, may be used to control the feel of the stop which will be experienced by the pilot. The balk feel characteristic determines the tactile feedback given to the pilot if they attempt to move the thrust lever in a direction to command the prohibited direction of thrust. Various balk feel characteristics may be used.

Figure 5:
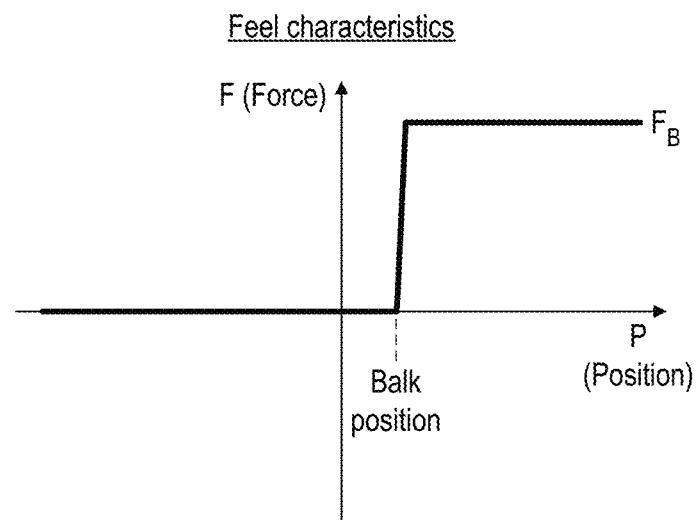
FIG. 5 illustrates one example of a balk feel characteristic profile which may be used in implementing a balk command in accordance with the present disclosure.

FIG. 5 illustrates a soft stop balk feel characteristic profile. This is for implementing a forward balk command. Thus, the force is applied to the thrust lever (whether a single thrust lever or a forward thrust lever of a thrust lever pair) for positive angular positions of the hub starting from a balk position. For negative angular positions and positive angular positions up to the balk position, the force applied is zero. The balk position may correspond to an idle position of the thrust lever as shown in FIG. 4, or a predetermined position in proximity thereto e.g. a few degrees after the idle position e.g. 3 degrees as shown in FIGS. 5 and 6 to provide some tolerance. At the balk position, the force applied increases to a constant balk force ($F_B$) level for inhibiting movement of the thrust lever in a direction to command (or increase) the prohibited direction of thrust i.e. forward. In this example, the force applied rises very steeply to reach the balk force substantially at the balk position.

Figure 6:
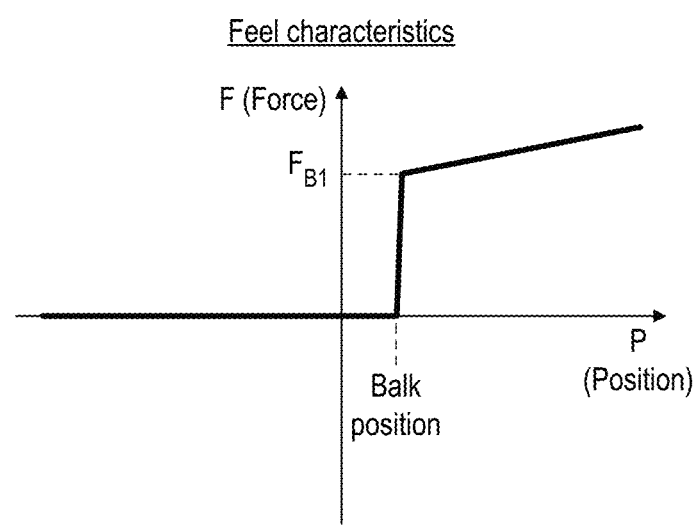
FIG. 6 illustrates another example of a balk feel characteristic profile which may be used in implementing a balk command in accordance with the present disclosure.

FIG. 6 illustrates an alternative balk feel characteristic profile for implementing a forward balk. The profile is similar to that of FIG. 5. However, at the balk position, the force rises steeply to a first balk force FBI, before increasing gradually as position increases. This may provide a soft stop and spring feel to the user.

It will be appreciated that the force applied to the thrust lever will bias the lever in a direction away from a direction which would command (or increase) the prohibited direction of thrust. By way of example, in relation to forward balk, the balk force may be programmed to be initiated at a position of the hub corresponding to 3 degrees into a forward thrust range (corresponding to the position of the lever or forward thrust lever). The thrust lever is initially at the idle i.e. 0 degree position. The pilot moves the lever forward to 3 degrees to initiate forward thrust. Until the lever is at 3 degrees, no balk force is felt. Once the lever reaches the 3 degree position, the pilot feels a balk force in accordance with the balk feel characteristic profile e.g. of FIG. 5 or 6 resisting movement of the lever. If the pilot continues to move the lever further into the forward thrust range, he will feel an opposing force on the lever corresponding to the balk force of FIG. 5 or 6 e.g. a constant or increasing force. The balk force is created by the torque of the motor, which acts on the hub.

As may be seen in FIG. 4, a balk feel characteristic profile for implementing a reverse balk command may be similar to that shown for the forward balk command in FIGS. 5 and 6, but will involve applying zero force until a balk position is reached. The balk position may be the idle position corresponding to zero degrees rotation of the hub, or a predetermined negative angle position in proximity thereto as shown in FIG. 4 (similar to the positive angle position shown in respect of forward balk in FIG. 5). The force profile will then be similar to that for providing forward balk, but the reverse balk force will be in the opposite direction for that providing forward balk i.e. negative in the profiles illustrated. FIG. 4 shows a reverse balk characteristic profile of an equivalent shape to that used for forward balk in the Figure i.e. of the type shown in FIG. 5. However, alternative profiles may be used, such as that shown in FIG. 6, with the force applied in the negative direction. If both forward and reverse balk is applied, the profiles shown in FIG. 4 will be used simultaneously, with the force applied to the lever for a given hub position being provided by combining the two balk characteristic profiles shown.

As mentioned above, whether an embodiment of the type used in FIG. 1A-C or FIG. 2A-C is used, angular positions of the hub (or reverse hub in the case of the embodiment of FIGS. 2A-C) in a range of movement associated with control of forward thrust may be taken as being positive, while those associated with a range of movement associated with control of reverse thrust may be taken as negative.

In any embodiment, a balk feel characteristic profile may be by reference to thrust lever position rather than hub position, since hub position may be correlated to lever position (i.e. the applicable lever where forward and reverse thrust levers are used).

A balk force may be applied when the lever is an applicable position over a duration that the balk command is applicable (for example, this may be after initial receipt of a balk command until a further command lifting the balk command is received, or until the balk command is no longer received).

It will be appreciated that if the force resisting movement of a thrust lever in a given direction is suddenly removed upon removal of a balk command, thrust lever overtravel/overshoot may occur as the operator is suddenly able to move the lever in the given direction without resistance. This is undesirable from a safety perspective, as the position of the thrust lever is linked to the thrust provided by the engine. To avoid this problem, in embodiments, a smooth transition filter may be used to result in the force applied at a given position smoothly decreasing to zero with respect to time when the balk command is removed.

Figure 7:
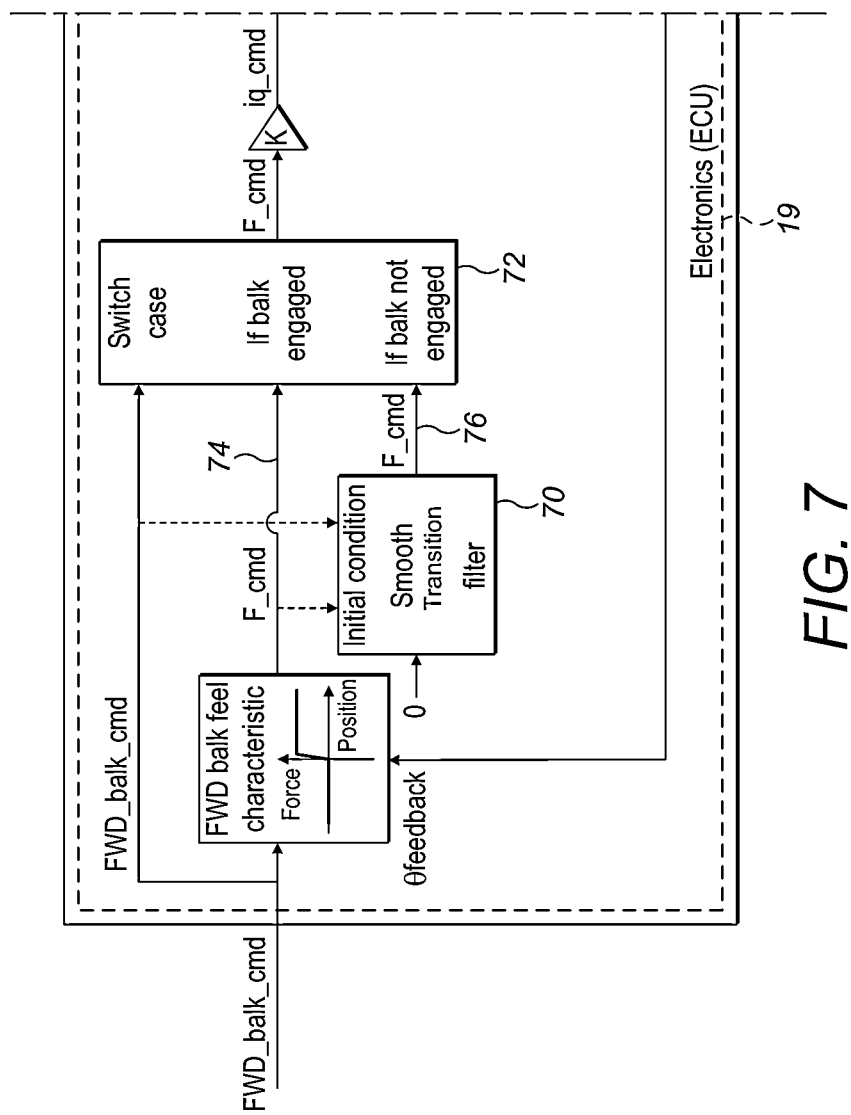
FIG. 7 illustrates one arrangement for providing a smooth transition upon removal of a balk command in accordance with an embodiment of the present disclosure.
Figure 7:
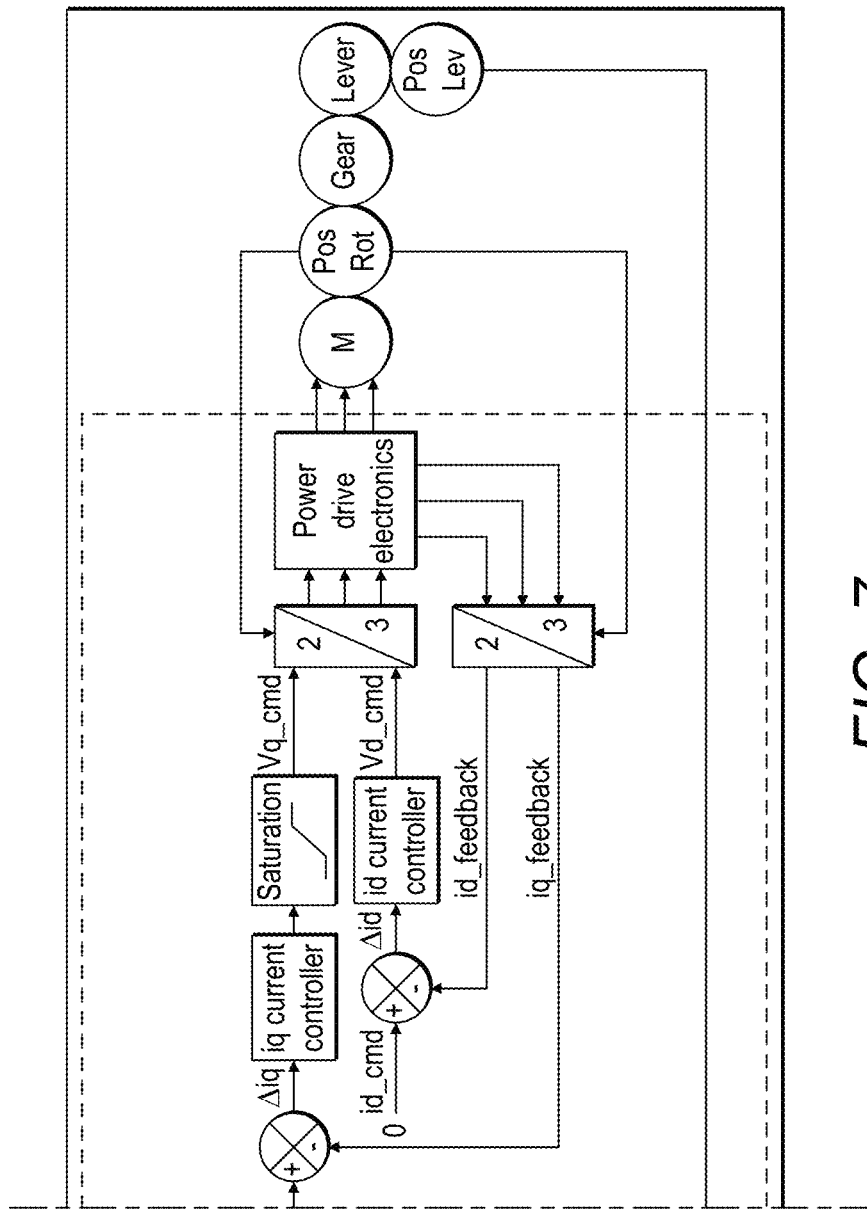

One example of such an embodiment is shown in FIG. 7. This illustrates the use of a smooth transition filter in relation to a forward balk command. A similar approach may be used in relation to a reverse balk, whether applied alone or in combination with forward balk. The arrangement of FIG. 7 for providing a forward balk corresponds to that of FIG. 4, but with the addition of a smooth transition filter 70 and switch 72.

The input of the smooth transition filter is always zero.

When a balk command is received by the auto-throttle ECU 19, the initial condition of the smooth transition filter is set to the applicable target force (F_cmd) at a given time. Thus the target force obtained by the target force setting arrangement based on the angular position feedback and balk feel characteristic profile is provided as an input to the switch. For the duration of the balk command, the initial condition for the filter will be set in this manner, to the applicable target force for the given time. Alternatively, the target current based on the target force may be used.

The forward balk command (FWD_balk_cmd), the target force (F_cmd), and the output of the smooth transition filter 70 are input to the switch 72. The switch 72 operates such that while a balk command is received i.e. balk is engaged, the output of the switch, and hence the input provided to the current control loop, will be F_cmd 74 i.e. the target force received from the target force setting arrangement without passing through the filter. If the balk is no longer engaged, the output of the switch, and hence the input F_cmd to the current control loop, will now be the output F_cmd 74 of the smooth transition filter. At the time the balk command is removed, this will be the initial value of the filter, i.e. F_cmd as provided from the target force setting arrangement to the filter for initialising the filter at the time the balk command is removed. The output of the filter, and hence the target force input to the current control loop will gradually decrease in accordance with the properties of the filter over a given time period, to provide a smooth reduction in force. Examples of suitable filters include a first order filter, although higher order filters may also be used. The cutoff frequency of the filter may be selected as desired, depending upon the period over which it is desired for the force to decrease to zero. For example a first order filter with a cutoff frequency in the range of from 0.25-2 Hz has been found to be particularly suitable. A suitable filter may be implemented in software. A first order filter has been found to provide a more natural feel to the pilot.

Figure 8:
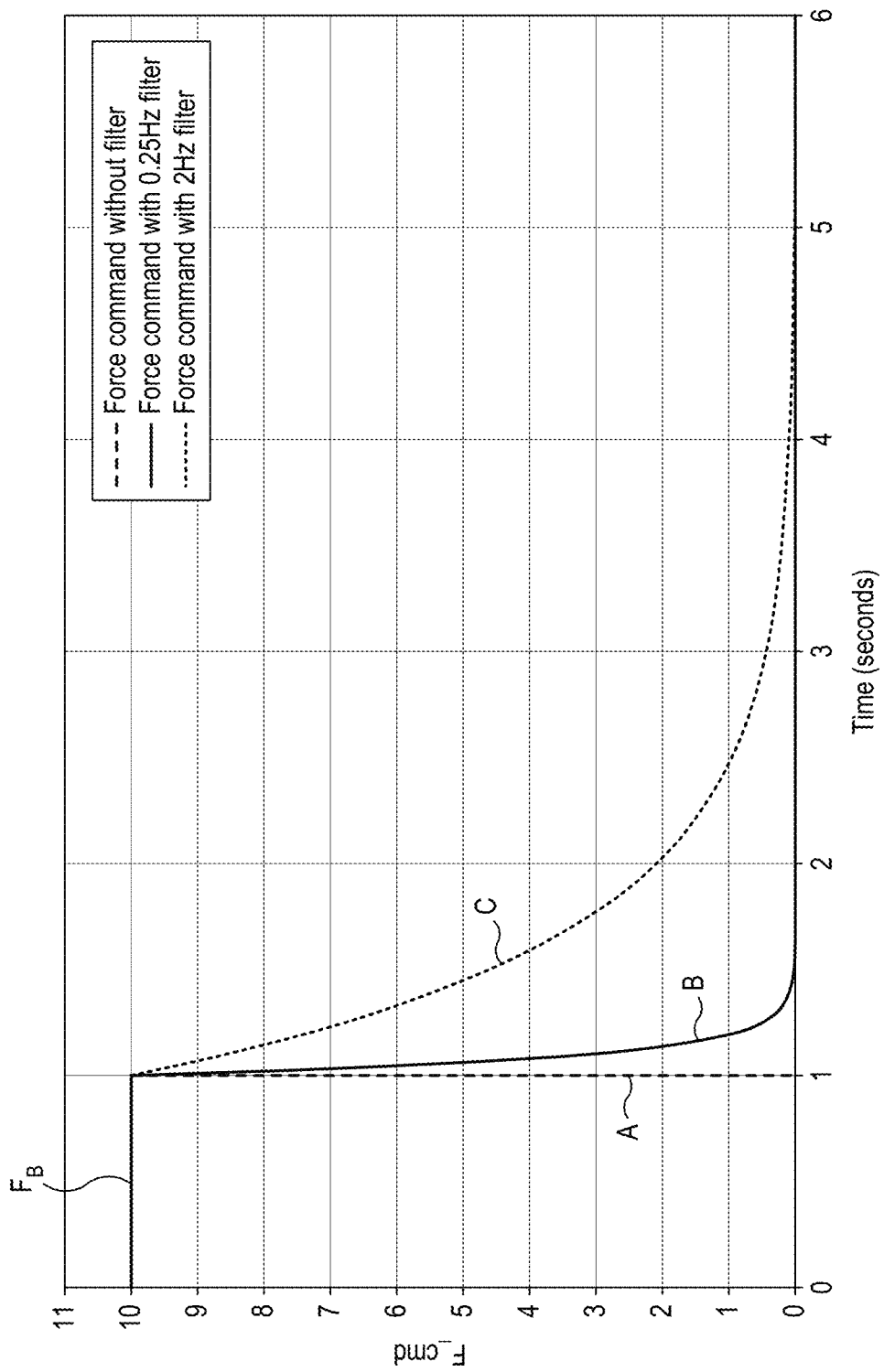
FIG. 8 illustrates the way in which the target force may decrease over time once the balk command is removed depending upon the properties of a smooth transition filter used.

The operation of the smooth transition filter will be illustrated with respect to FIG. 8. The filter is a first order filter. FIG. 8 illustrates the effect of providing such a filter, and of using filters with different cutoff frequencies, upon the target force output inputted to the current loop. FIG. 8 illustrates the target force (F_cmd) with respect to time. Here, the balk command is applied for a time TB, corresponding to 1 second. If no smooth transition filter is provided, the force will decrease from a balk force FB of 10N at the time the balk command is removed i.e. 10N to zero instantaneously—dashed line profile A. If a smooth transition filter in the form of a 2 Hz low pass filter is provided, the target force (F_cmd) will decrease exponentially over a period of 0.5 seconds—solid line profile B. If a smooth transition filter in the form of a 0.25 Hz low pass filter is provided, the target force (F_cmd) will decrease exponentially over a period of 4 seconds—dotted line profile C.

It will be appreciated that, rather than using the target force as the input to the filter, the target current may alternatively be used, with the output of the filter then providing a smoothly decreasing target current for input to the current loop upon removal of a balk command, rather than a target force for use in determining such a target current.

A forward or reverse balk command may be received e.g. by a balk application arrangement from any suitable control system of an aircraft when it is deemed inappropriate for thrust to be applied in a direction. The balk application arrangement is provided in embodiments, by the circuitry described to implement a desired balk feel characteristic i.e. opposing force with respect to lever position. This includes the circuitry described for setting a target force to implement a balk force e.g. based on a balk feel characteristic profile, taking into account lever position. Thus, the balk application arrangement includes the force and current loops described for implementing a balk command, optionally in accordance with a balk feel characteristic profile.

Although the present disclosure has been described with reference to various embodiments, it will be understood by those skilled in the art that various changes in form and detail may be made without departing from the scope of the disclosure as set forth in the accompanying claims.

The invention claimed is:

1. A thrust control assembly for an aircraft comprising;
a movable thrust lever configured to be used by a pilot to control the thrust of an engine of the aircraft when implementing at least one of forward and reverse thrust modes of the aircraft,
wherein the thrust lever is coupled to a hub at least in the at least one of forward and reverse thrust modes of the aircraft wherein movement of the thrust lever causes movement of the hub, and, conversely, movement of the hub causes movement of the thrust lever, wherein the position of the hub controls an amount of thrust of the engine when operating in the at least one of forward or reverse thrust modes;
an auto-throttle actuator arranged to automatically move the hub for controlling the position of the hub to thereby control a forward thrust amount of the aircraft when the aircraft is operating in forward thrust mode in flight and an auto-throttle mode is enabled;
a balk application arrangement to provide, in response to a balk command received by the balk application arrangement to prohibit command of thrust in a balk direction corresponding to a or the given thrust direction which the thrust lever is operable to control, a balk force on the thrust lever acting to oppose an attempt by the pilot to move the thrust lever in a direction to command or increase thrust in the balk direction;
wherein the balk application arrangement is arranged to control the auto-throttle actuator to provide the balk force on the thrust lever;
wherein up to a balk position, the balk application arrangement does not apply a balk force on the thrust lever, and then starting from the balk position, as the position of the thrust lever increases in the balk direction the balk force applied rises very steeply to reach a constant balk force;
wherein the auto-throttle actuator comprises a motor arranged to cause movement of the hub, and the balk application arrangement is arranged to control a torque of the motor of the auto-throttle actuator to provide the balk force on the thrust lever; and wherein the motor comprises a pinion which is caused to rotate with the motor, and the pinion of the motor cooperates with a gear associated with the hub to cause rotation of the hub, such that the motor directly drives the hub.

2. The thrust control assembly of claim 1 wherein the balk application arrangement is arranged to provide a balk force on the thrust lever based on a determined position of the thrust lever.

3. The thrust control assembly of claim 2 wherein the position of the thrust lever is determined based on a sensed position of a rotor of a motor of the auto-throttle actuator and a sensed position of the thrust lever.

4. The thrust control assembly of claim 1 wherein the balk application arrangement is arranged to control the auto-throttle actuator to provide a balk force in accordance with a balk feel characteristic profile, indicative of a desired dependence of balk force upon position of the thrust lever.

5. The thrust control assembly of claim 4 wherein the balk feel characteristic profile is indicative that a constant opposing force is to be applied to the thrust lever over a given range of movement of the thrust lever in the balk direction to command or increase thrust in the balk direction; or wherein the balk feel characteristic profile is indicative that an increasing opposing force is to be applied to the thrust lever over a given range of movement of the thrust lever in the balk direction so as to command or increase thrust in the balk direction.

6. The thrust control assembly of claim 1 wherein the thrust control assembly comprises a single thrust lever which is operable to control a thrust amount of the engine when operating in both forward and reverse thrust modes, wherein the thrust lever is moveable within a first range of motion for controlling a forward thrust amount of the engine and within a second range of motion for controlling a reverse thrust amount of the engine.

7. The thrust control assembly of claim 1 wherein the thrust lever is one of a pair of thrust levers which are configured to be used by a pilot to control the thrust of an engine of the aircraft in forward and reverse thrust modes of the aircraft, wherein the pair of thrust levers includes a forward thrust lever which is operable to control a thrust amount of the engine when operating in forward thrust mode, and a reverse thrust lever which is operable to control a thrust amount of the engine when operating in a reverse thrust mode.

8. The thrust control assembly of claim 1 wherein the balk application arrangement comprises a smooth transition arrangement for providing a gradual reduction in balk force upon removal of the balk command, wherein the smooth transition arrangement comprises a smooth transition filter.

9. The thrust control assembly of claim 8 wherein the smooth transition filter is a first order.

10. The thrust control assembly of claim 1 wherein the thrust control assembly is free from solenoids.

11. The thrust control assembly of claim 1 wherein the balk command is received by the balk application arrangement from a control system of the aircraft, wherein the control system is arranged to generate a balk command for prohibiting the application of thrust in a balk direction when the control system has determined that application of thrust in the balk direction would be inappropriate.

12. A system for an aircraft comprising;
the thrust control assembly of claim 1;
a thrust reverser system comprising blocker doors for use in diverting thrust to implement a reverse thrust system of the aircraft in use and a control system, wherein the control system is arranged to generate a balk command for input to the balk application arrangement prohibiting the application of thrust in a balk direction based on a position of the blocker doors.

13. A method of using the thrust control assembly of claim 1 to provide a balk force on the thrust lever, wherein the balk force is a force acting to oppose an attempt by the pilot to move the thrust lever in a direction so as to command or increase thrust in a balk direction, the method comprising;
the balk application arrangement receiving a balk command to prohibit command of thrust in a balk direction corresponding to a or the given thrust direction which the thrust lever is operable to control,
and controlling the auto-throttle actuator to provide the balk force on the thrust lever.

14. The method of claim 13 further comprising;
using a smooth transition arrangement to provide a gradual reduction in balk force upon removal of the balk command, wherein the smooth transition arrangement comprises a smooth transition filter.

15. The thrust control assembly of claim 13, wherein the balk command is generated based on a position of blocker doors of a thrust reverser system of the aircraft.

16. The thrust control assembly of claim 1, wherein thrust lever is arranged to move with the hub.

17. A thrust control assembly for an aircraft comprising;
a movable thrust lever configured to be used by a pilot to control the thrust of an engine of the aircraft when implementing at least one of forward and reverse thrust modes of the aircraft,
wherein the thrust lever is coupled to a hub at least in the at least one of forward and reverse thrust modes of the aircraft wherein movement of the thrust lever causes movement of the hub, and, conversely, movement of the hub causes movement of the thrust lever, wherein the position of the hub controls an amount of thrust of the engine when operating in the at least one of forward or reverse thrust modes;
an auto-throttle actuator arranged to automatically move the hub for controlling the position of the hub to thereby control a forward thrust amount of the aircraft when the aircraft is operating in forward thrust mode in flight and an auto-throttle mode is enabled;
a balk application arrangement to provide, in response to a balk command received by the balk application arrangement to prohibit command of thrust in a balk direction corresponding to a or the given thrust direction which the thrust lever is operable to control, a balk force on the thrust lever acting to oppose an attempt by the pilot to move the thrust lever in a direction to command or increase thrust in the balk direction;
wherein the balk application arrangement is arranged to control the auto-throttle actuator to provide the balk force on the thrust lever;
wherein starting from a balk position, as the position of the thrust lever increases in the balk direction the balk force applied rises very steeply to reach a constant balk force;
wherein the balk application arrangement comprises a smooth transition arrangement for providing a gradual reduction in balk force upon removal of the balk command, wherein the smooth transition arrangement comprises a smooth transition filter;
wherein the smooth transition filter is a first order; and
wherein the smooth transition filter has a cutoff frequency within the range of from 0.25 Hz to 2 Hz.

18. A thrust control assembly for an aircraft comprising;
a movable thrust lever configured to be used by a pilot to control the thrust of an engine of the aircraft when implementing at least one of forward and reverse thrust modes of the aircraft,
wherein the thrust lever is coupled to a hub at least in the at least one of forward and reverse thrust modes of the aircraft wherein movement of the thrust lever causes movement of the hub, and, conversely, movement of the hub causes movement of the thrust lever, wherein the position of the hub controls an amount of thrust of the engine when operating in the at least one of forward or reverse thrust modes;
an auto-throttle actuator arranged to automatically move the hub for controlling the position of the hub to thereby control a forward thrust amount of the aircraft when the aircraft is operating in forward thrust mode in flight and an auto-throttle mode is enabled;
a balk application arrangement to provide, in response to a balk command received by the balk application arrangement to prohibit command of thrust in a balk direction corresponding to a or the given thrust direction which the thrust lever is operable to control, a balk force on the thrust lever acting to oppose an attempt by the pilot to move the thrust lever in a direction to command or increase thrust in the balk direction;
wherein the balk application arrangement is arranged to control the auto-throttle actuator to provide the balk force on the thrust lever, and
wherein up to a balk position, the balk application arrangement does not apply a balk force on the thrust lever, and then starting from the balk position, as the position of the thrust lever increases in the balk direction the balk force applied rises steeply to a first balk force before increasing gradually;
wherein the auto-throttle actuator comprises a motor arranged to cause movement of the hub, and the balk application arrangement is arranged to control a torque of the motor of the auto-throttle actuator to provide the balk force on the thrust lever; and
wherein the motor comprises a pinion which is caused to rotate with the motor, and the pinion of the motor cooperates with a gear associated with the hub to cause rotation of the hub, such that the motor directly drives the hub.

19. A thrust control assembly for an aircraft comprising;
a movable thrust lever configured to be used by a pilot to control the thrust of an engine of the aircraft when implementing at least one of forward and reverse thrust modes of the aircraft,
wherein the thrust lever is coupled to a hub at least in the at least one of forward and reverse thrust modes of the aircraft wherein movement of the thrust lever causes movement of the hub, and, conversely, movement of the hub causes movement of the thrust lever, wherein the position of the hub controls an amount of thrust of the engine when operating in the at least one of forward or reverse thrust modes;
an auto-throttle actuator arranged to automatically move the hub for controlling the position of the hub to thereby control a forward thrust amount of the aircraft when the aircraft is operating in forward thrust mode in flight and an auto-throttle mode is enabled;
a balk application arrangement to provide, in response to a balk command received by the balk application arrangement to prohibit command of thrust in a balk direction corresponding to a or the given thrust direction which the thrust lever is operable to control, a balk force on the thrust lever acting to oppose an attempt by the pilot to move the thrust lever in a direction to command or increase thrust in the balk direction;
wherein the balk application arrangement is arranged to control the auto-throttle actuator to provide the balk force on the thrust lever;
wherein starting from a balk position, as the position of the thrust lever increases in the balk direction the balk force applied rises very steeply to a first balk force before increasing gradually;
wherein the balk application arrangement comprises a smooth transition arrangement for providing a gradual reduction in balk force upon removal of the balk command, wherein the smooth transition arrangement comprises a smooth transition filter;
wherein the smooth transition filter is a first order; and
wherein the smooth transition filter has a cutoff frequency within the range of from 0.25 Hz to 2 Hz.

* * * * *